United States Patent
Sugaya et al.

(10) Patent No.: US 11,473,466 B2
(45) Date of Patent: Oct. 18, 2022

(54) EXHAUST GAS PROCESSING DEVICE

(71) Applicant: Marelli Corporation, Saitama (JP)

(72) Inventors: Daisuke Sugaya, Saitama (JP);
Shunichi Mitsuishi, Saitama (JP);
Takaharu Yamamoto, Saitama (JP);
Satoru Yokoshima, Saitama (JP);
Tooru Hisanaga, Saitama (JP);
Daisuke Shimamura, Saitama (JP)

(73) Assignee: Marelli Corporation, Saitama (JP)

( * ) Notice: Subject to any disclaimer, the term of this patent is extended or adjusted under 35 U.S.C. 154(b) by 0 days.

(21) Appl. No.: 17/421,213

(22) PCT Filed: Dec. 17, 2019

(86) PCT No.: PCT/JP2019/049469
§ 371 (c)(1),
(2) Date: Jul. 7, 2021

(87) PCT Pub. No.: WO2020/145050
PCT Pub. Date: Jul. 16, 2020

(65) Prior Publication Data
US 2022/0065147 A1    Mar. 3, 2022

(30) Foreign Application Priority Data

Jan. 9, 2019 (JP) .............................. JP2019-001568
Feb. 28, 2019 (JP) .............................. JP2019-036290
(Continued)

(51) Int. Cl.
*F01N 13/08* (2010.01)
*F01N 3/20* (2006.01)
(Continued)

(52) U.S. Cl.
CPC ........... *F01N 3/2013* (2013.01); *F01N 3/035* (2013.01); *F01N 3/101* (2013.01); *F01N 3/28* (2013.01);
(Continued)

(58) Field of Classification Search
CPC .. F01N 3/2892; F01N 13/009; F01N 2240/20; F01N 2470/18; F01N 2470/24
See application file for complete search history.

(56) References Cited

U.S. PATENT DOCUMENTS

2012/0198838 A1\* 8/2012 Bruck ....................... F01N 3/28
60/605.1
2015/0330279 A1\* 11/2015 Melecosky ........ B01D 53/9477
60/299

(Continued)

FOREIGN PATENT DOCUMENTS

JP     S62109361 U    7/1987
JP     H05163935 A    6/1993

(Continued)

OTHER PUBLICATIONS

Machine translation of JP H05-163935 A, accessed Jan. 19, 2022. (Year: 2022).\*

*Primary Examiner* — Jonathan R Matthias
(74) *Attorney, Agent, or Firm* — Young Basile Hanlon & MacFarlane, P.C.

(57) ABSTRACT

In an exhaust gas processing device, an air-fuel ratio sensor is provided such that a measuring portion is located in a region surrounded by a downstream-side end surface of a TWC, an upstream-side end surface of a GPF, and an inner wall surface of a case against which the exhaust gas G that has passed through the TWC flows, that is the region a region on the GPF side of the center of the TWC.

17 Claims, 27 Drawing Sheets

(30) Foreign Application Priority Data

Mar. 27, 2019 (JP) .............................. JP2019-060300
Sep. 25, 2019 (JP) .............................. JP2019-174526

(51) Int. Cl.
| | | |
|---|---|---|
| *F01N 13/00* | (2010.01) | |
| *F01N 3/035* | (2006.01) | |
| *F01N 3/10* | (2006.01) | |
| *F01N 3/28* | (2006.01) | |
| *F01N 13/18* | (2010.01) | |

(52) U.S. Cl.
CPC ....... *F01N 13/008* (2013.01); *F01N 13/0097* (2014.06); *F01N 13/1805* (2013.01); *F01N 2240/16* (2013.01); *F01N 2450/22* (2013.01); *F01N 2490/00* (2013.01); *F01N 2560/025* (2013.01)

(56) References Cited

U.S. PATENT DOCUMENTS

| | | | |
|---|---|---|---|
| 2015/0377110 A1* | 12/2015 | Sandberg | B01D 53/9477 422/171 |
| 2017/0276047 A1* | 9/2017 | Takase | F01N 3/2026 |
| 2018/0258822 A1* | 9/2018 | Kuramashi | F01N 13/0097 |
| 2018/0258826 A1* | 9/2018 | Kuramashi | F01N 3/10 |
| 2020/0032685 A1 | 1/2020 | Kuramashi et al. | |
| 2020/0208556 A1* | 7/2020 | Car | F01N 13/009 |

FOREIGN PATENT DOCUMENTS

| | | |
|---|---|---|
| JP | H09158715 A | 6/1997 |
| JP | 2008075458 A | 4/2008 |
| JP | 2008267161 A | 11/2008 |
| JP | 2011117409 A | 6/2011 |
| JP | 2011241705 A | 12/2011 |
| JP | 2013228231 A | 11/2013 |
| JP | 2018096345 A | 6/2018 |
| JP | 2019152138 A | 9/2019 |

* cited by examiner

EXHAUST GAS PROCESSING DEVICE

CROSS REFERENCE TO RELATED APPLICATIONS

The present application claims priority to Japanese Patent Application No. 2019-001568, filed Jan. 9, 2019, Japanese Patent Application No. 2019-036290, filed Feb. 28, 2019, Japanese Patent Application No. 2019-060300, filed on Mar. 27, 2019, and Japanese Patent Application No. 2019-174526, filed Sep. 25, 2019, the entire disclosures of which are hereby incorporated by reference.

TECHNICAL FIELD

The present invention relates to an exhaust gas processing device.

BACKGROUND

JP2008-075458A discloses a configuration provided with an air-fuel ratio sensor for detecting oxygen concentration in exhaust gas that has passed through a catalytic converter in an exhaust passage in which the catalytic converter and a DPF (diesel particulate filter) are provided so as to be linearly arranged side by side.

SUMMARY

Incidentally, a conventional exhaust gas processing device arranged in the vicinity of an internal combustion engine is required to be small due to a limited space for an installation, while mounting a plurality of catalysts in order to comply with emission control regulations. In addition, the exhaust gas processing device needs to determine exhaust gas components that have passed through the catalyst with a high accuracy, and it has been difficult to configure the exhaust gas processing device so as to satisfy these requirements.

An object of the present invention is to propose a small exhaust gas processing device capable of determining exhaust gas components with high accuracy while mounting a plurality of catalysts.

According to an aspect of the present invention, an exhaust gas processing device includes: a first catalyst carrier configured to clean exhaust gas flowing along the first direction; a second catalyst carrier configured to clean the exhaust gas that has passed through the first catalyst carrier, the exhaust gas flowing along a second direction intersecting with the first direction; a case configured to accommodate the first catalyst carrier and the second catalyst carrier; and a sensor having a measuring portion for measuring the exhaust gas, the sensor being configured to determine the exhaust gas that has passed through the first catalyst carrier, wherein the measuring portion of the sensor is arranged in a region surrounded by a downstream-side end surface of the first catalyst carrier, an upstream-side end surface of the second catalyst carrier, and an inner wall surface of the case, the inner wall surface being configured to receive the exhaust gas that has passed through the first catalyst carrier, the region being on the second catalyst carrier side of a center of the first catalyst carrier.

In the above-described aspect, the measuring portion of the sensor is located in the region surrounded by the downstream-side end surface of the first catalyst carrier, the upstream-side end surface of the second catalyst carrier, and the inner wall surface of the case, that is the region on the second catalyst carrier side of the center of the first catalyst carrier. In the region where the measuring portion of the sensor is arranged, because the main flow of the flow of the exhaust gas directed from the first catalyst carrier to the second catalyst carrier is formed by allowing the exhaust gas that has passed through the first catalyst carrier to flow against the inner wall surface of the case, the flow rate of the exhaust gas becomes relatively high. Therefore, by arranging the first catalyst carrier and the second catalyst carrier such that the flowing direction of the exhaust gas flowing through the first catalyst carrier intersects with the flowing direction of the exhaust gas flowing through the second catalyst carrier, the reduction in size of the exhaust gas processing device is realized while sufficiently ensuring the cleaning function for the exhaust gas, and further, even with such a configuration, highly accurate detection of the exhaust gas can be achieved by the sensor determining the exhaust gas.

DETAILED DESCRIPTION

Embodiments of the present invention will be described below with reference to the attached drawings.

First Embodiment

Figure 1:
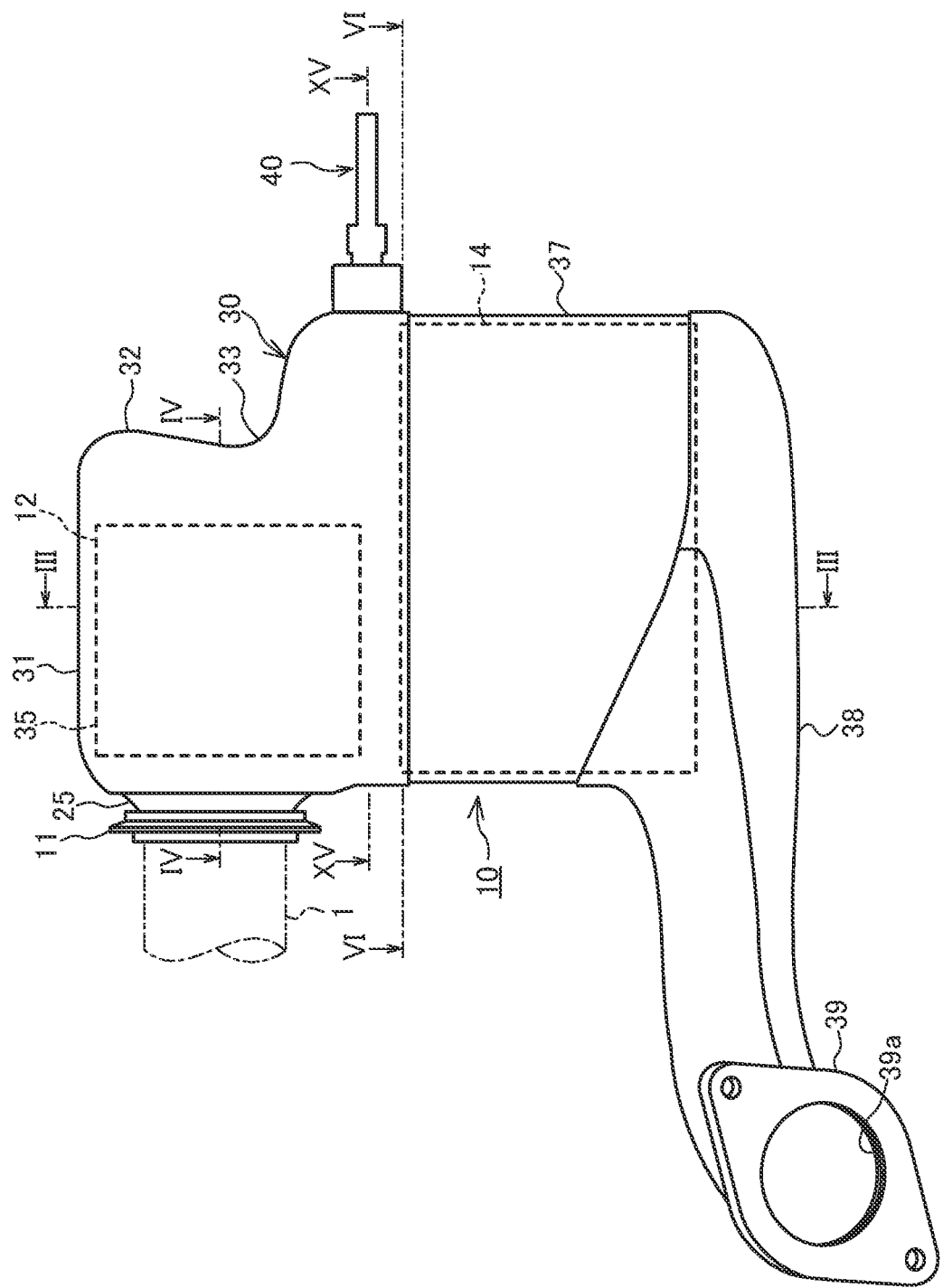
FIG. 1 is a side view of an exhaust gas processing device according to a first embodiment of the present invention.
Figure 2:
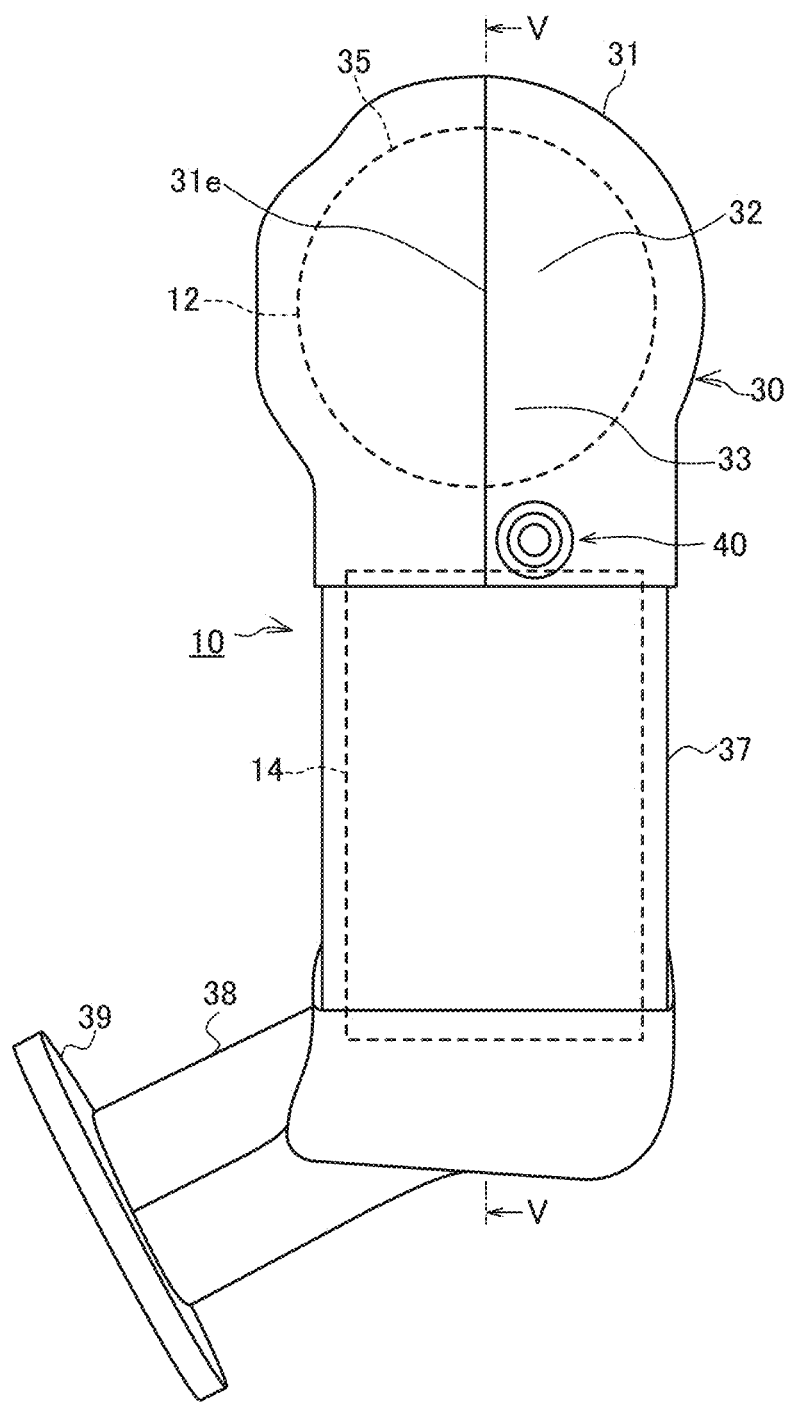
FIG. 2 is a rear view of the exhaust gas processing device according to the first embodiment of the present invention.
Figure 3:
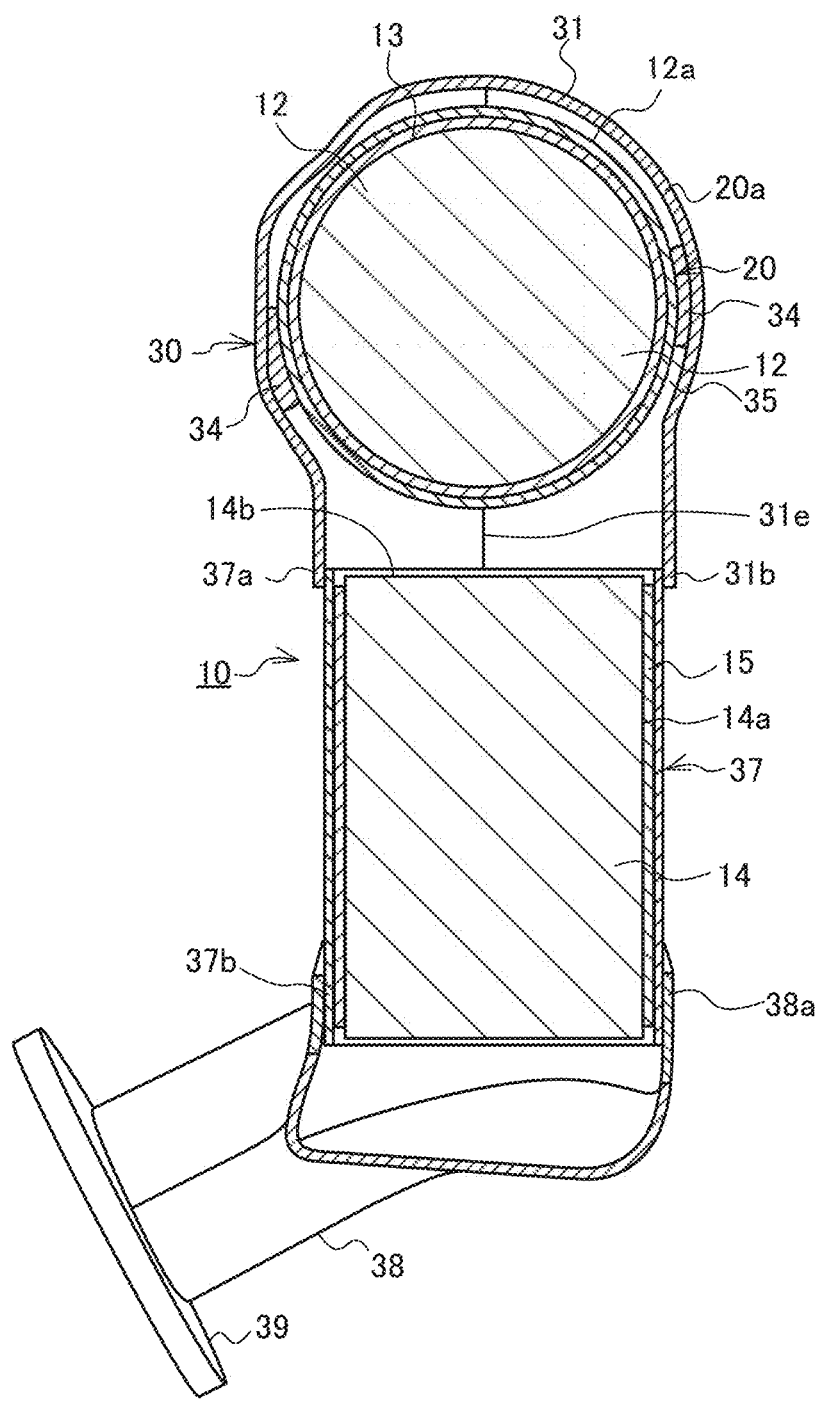
FIG. 3 is a sectional view taken along line III-III in FIG. 1.
Figure 4:
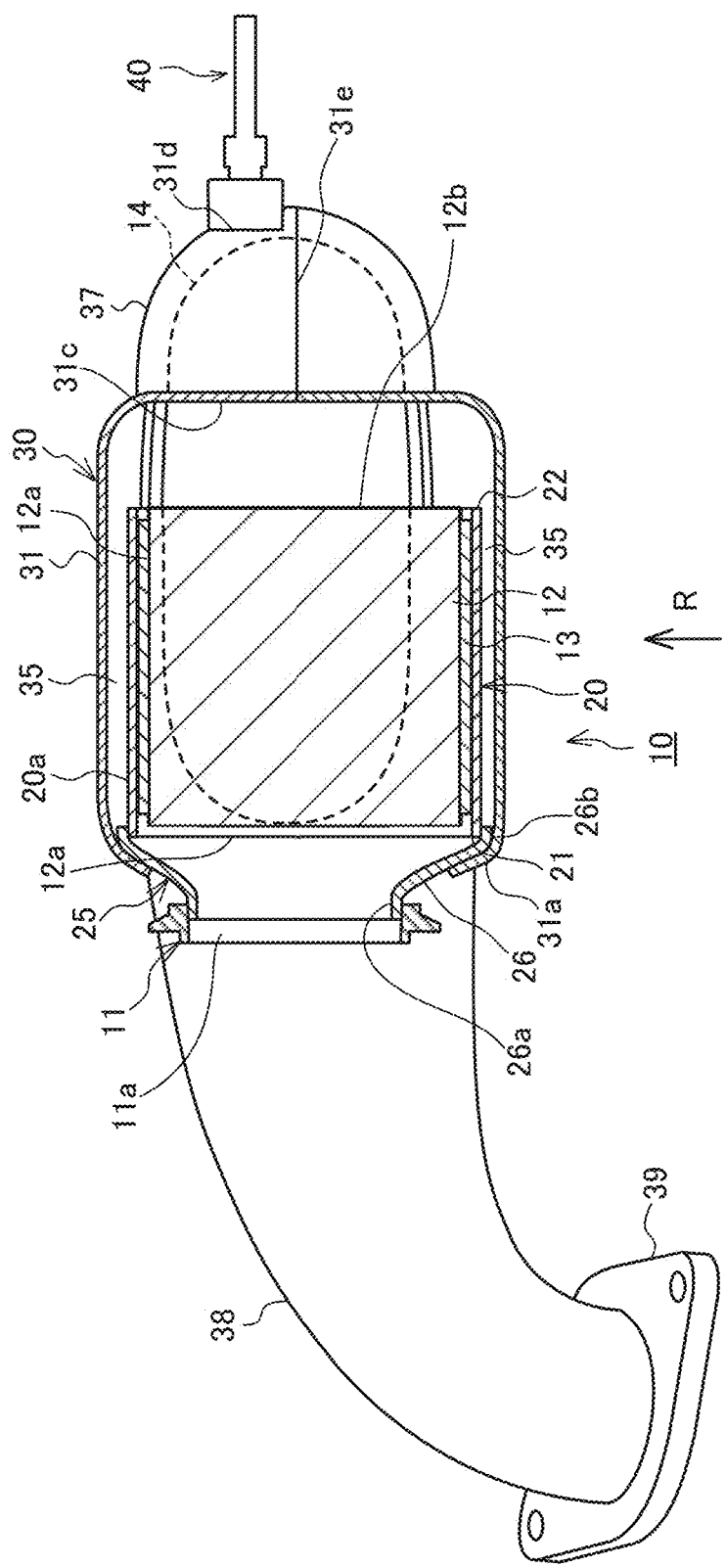
FIG. 4 is a sectional view taken along line IV-IV in FIG. 1.
Figure 5:
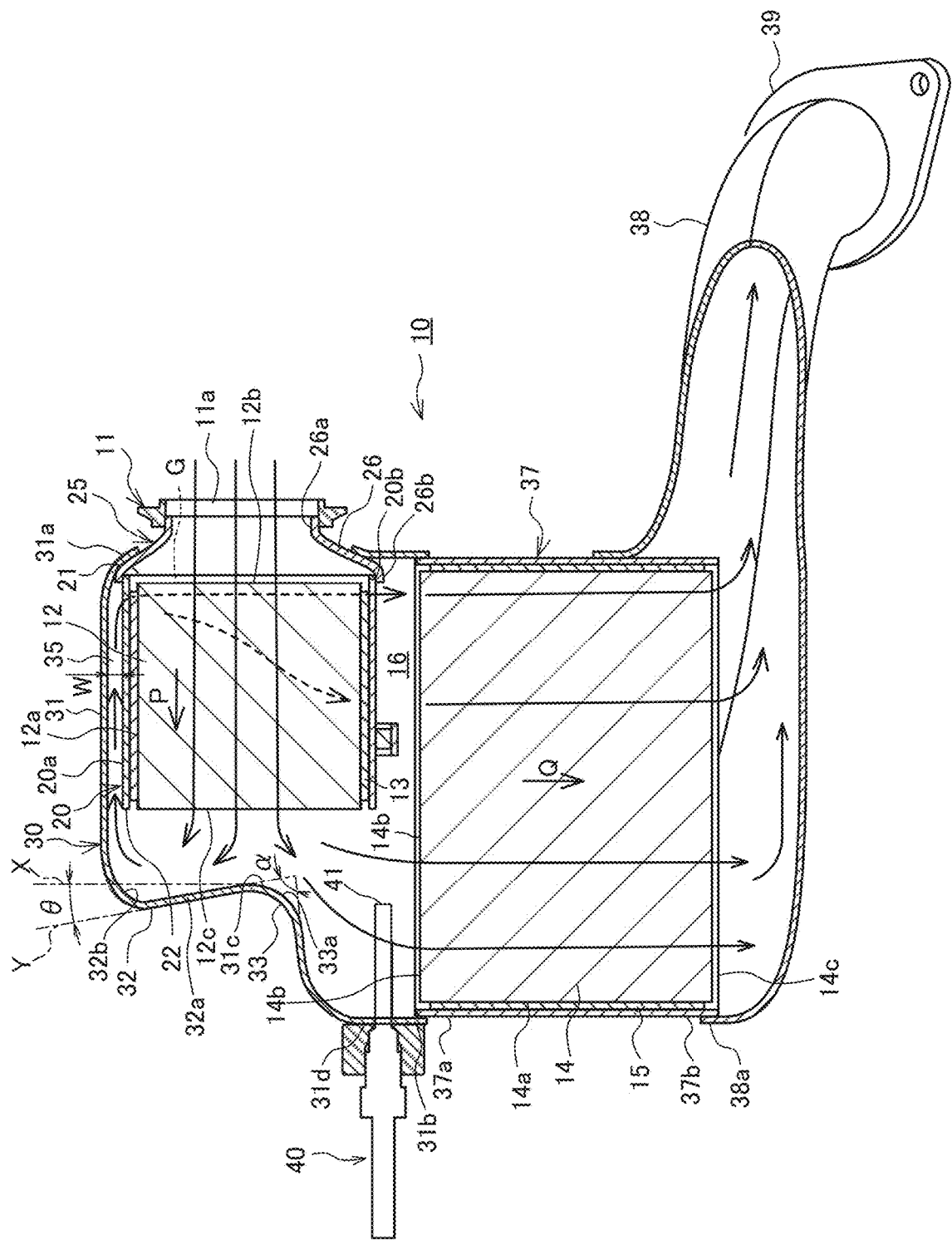
FIG. 5 is a sectional view taken along line V-V in FIG. 2.
Figure 6:
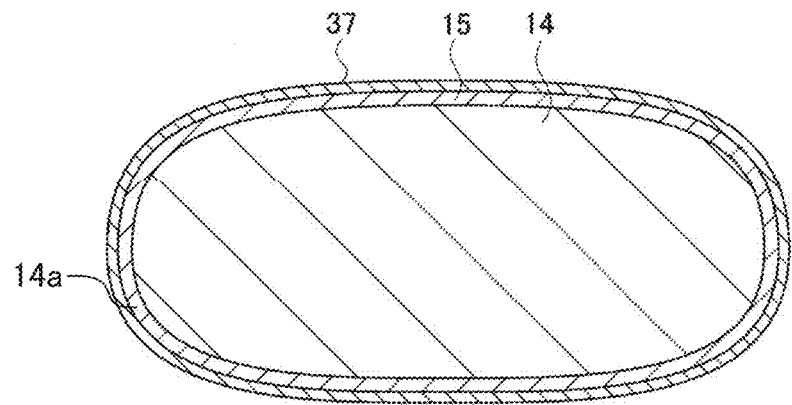
FIG. 6 is a sectional view taken along line VI-VI in FIG. 1.
Figure 7:
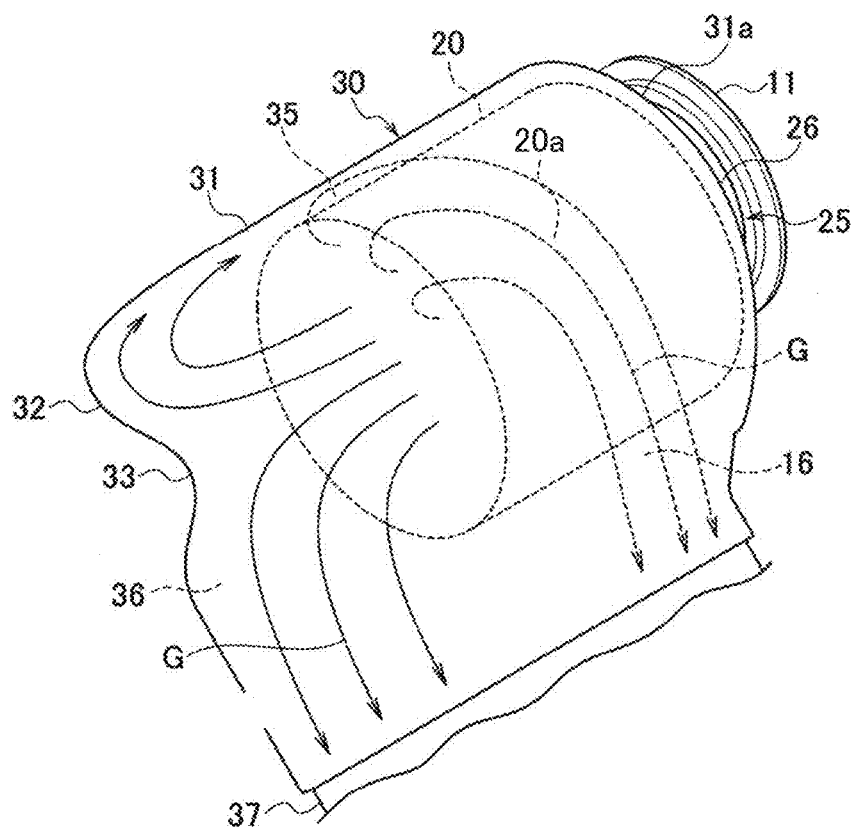
FIG. 7 is a partial perspective view showing a flow of exhaust gas in a case of the exhaust gas processing device.

An exhaust gas processing device 10 according to a first embodiment of the present invention will be described with reference to FIGS. 1 to 7. FIG. 1 is a side view showing the exhaust gas processing device 10 according to the first embodiment. FIG. 2 is a rear view of the exhaust gas processing device 10. FIG. 3 is a sectional view taken along line III-III in FIG. 1 of the exhaust gas processing device 10. FIG. 4 a sectional view taken along line IV-IV in FIG. 1 of the exhaust gas processing device 10. FIG. 5 is a sectional view taken along line V-V in FIG. 2 of the exhaust gas processing device 10. FIG. 6 is a sectional view taken along line VI-VI in FIG. 1 of the exhaust gas processing device 10. FIG. 7 is a partial perspective view showing flows of exhaust gas G in a case 30 of the exhaust gas processing device 10.

The exhaust gas processing device 10 is, for example, mounted on a vehicle and processes the exhaust gas G discharged from an engine (not shown), and the following embodiments show example configurations as a small catalytic converter having an excellent exhaust gas cleaning function. Specifically, the exhaust gas processing device 10 cleans the exhaust gas G by converting hydrocarbons and carbon monoxide contained in the exhaust gas G to carbon dioxide and water via oxidation, and performs reduction of nitrogen oxides and removal of fine particulate matters.

As shown in FIGS. 1 to 5, the exhaust gas processing device 10 is provided with: the case 30 having an inlet-side flange 11 that is connected to an exhaust gas outlet portion of an exhaust gas turbine (not shown) and an outlet-side flange 39 that is connected to an exhaust tube (not shown) that guides the exhaust gas G to the outside; a TWC (three way catalyst) 12 serving as a first catalyst carrier that is provided in the case 30 and cleans the exhaust gas G; a GPF (gasoline particulate filter) 14 serving as a second catalyst carrier that is provided at the downstream side of the TWC 12 in the case 30 and cleans the exhaust gas G that has passed through the TWC 12; and an air-fuel ratio sensor 40 serving as a sensor for determining oxygen concentration in the exhaust gas G that has passed through the TWC 12.

The case 30 has a diffuser portion 25 to which the inlet-side flange 11 is attached, an inlet-side barrel portion 31 that accommodates the TWC 12 in the inside thereof, a middle barrel portion 37 that is joined with the inlet-side barrel portion 31 and accommodates the GPF 14 in the inside thereof, and an outlet-side barrel portion 38 that is joined with the middle barrel portion 37 at one end thereof and that is provided with, on the other end thereof, the outlet-side flange 39 to be connected to an exhaust-side conduit (not shown).

As shown in FIGS. 4 and 5, the diffuser portion 25 is formed of a diffuser plate 26 having a circular conical surface shape, the diameter of which is gradually increased towards the downstream. The inlet-side flange 11 is attached to an outer circumferential surface of an upstream-side opening portion 26a of the diffuser plate 26 by welding, etc. A downstream-side opening portion 26b of the diffuser plate 26 is attached to an inner circumferential surface of an inlet-side opening portion 31a of the inlet-side barrel portion 31 by the welding, etc.

As shown in FIG. 5, the inlet-side barrel portion 31 has the inlet-side opening portion 31a through which the exhaust gas G enters and an outlet-side opening portion 31b through which the exhaust gas G flows out. The inlet-side barrel portion 31 is configured such that the flow of the exhaust gas G passing through the inlet-side barrel portion 31 is bent by a predetermined angle (for example, 90°), in other words, such that a substantially L-shaped flow path is formed. The inlet-side barrel portion 31 is formed by joining two metallic plate members, which are formed so as to be symmetric along the flowing direction of the exhaust gas G, by the welding, etc. (see FIGS. 2 to 4).

As shown in FIG. 6, the middle barrel portion 37 is formed of a metallic plate member so as to have an oval barrel shape. As shown in FIG. 5, an outer circumferential surface of an inlet-side opening portion 37a of the middle barrel portion 37 is joined with an inner circumferential surface of the outlet-side opening portion 31b of the inlet-side barrel portion 31 by the welding, etc. In addition, an outer circumferential surface of an outlet-side opening portion 37b of the middle barrel portion 37 is joined with an inner circumferential surface of an inlet-side opening portion 38a of the outlet-side barrel portion 38 by the welding, etc.

The TWC 12 is, for example, formed of a columnar-shaped honeycomb structure body. An outer circumferential surface 12a of the TWC 12 is fitted to a metallic barrel-shaped inner case 20 via a cushioning material 13. The TWC 12 is accommodated in the inner case 20 over the entirety in the axial direction.

An upstream-side opening portion 20b of the inner case 20 is inserted into an inner circumference of the downstream-side opening portion 26b of the diffuser plate 26. The inner case 20 is joined with an inner circumferential surface of the diffuser plate 26 by the welding, etc., thereby being fixed with respect to the case 30. At this time, the inner case 20 is provided in the case 30 such that a spacing of a predetermined distance W is formed between an outer circumferential surface 20a of the inner case 20 and the inlet-side barrel portion 31. This spacing forms an outer circumference flow path 35 through which the exhaust gas G flows. In addition, as shown in FIG. 3, a plurality of spacers 34 for preventing rattling of the inner case 20 is provided between the outer circumferential surface 20a of the inner case 20 and the inlet-side barrel portion 31.

As described above, as the upstream-side opening portion 20b of the inner case 20 is joined with the downstream-side opening portion 26b of the diffuser plate 26, it is possible to guide all of the exhaust gas G that has entered from an exhaust inlet 11a of the inlet-side flange 11 to the TWC 12.

The GPF 14 is, for example, formed of an oval columnar-shaped ceramic filter for removing the fine particulate matters (see FIGS. 4 and 6). The GPF 14 is fixed within the middle barrel portion 37 by fitting an outer circumferential surface 14a thereof to an inner circumferential surface of the middle barrel portion 37 via a cushioning material 15. With such a configuration, the TWC 12 and the GPF 14 are arranged in a so-called T-shape when viewed from the side.

In addition, the GPF 14 is formed such that its flow-passage cross-sectional area is larger than the flow-passage cross-sectional area of the TWC 12. At this time, as shown in FIG. 4, the GPF 14 is provided in the middle barrel portion 37 such that its major axis is located along the axial-line direction of the TWC 12. By arranging the GPF 14 as described above, for example, even if a space cannot be ensured in the width direction of the exhaust gas processing device 10 (the vertical direction in FIG. 4), the flow-passage cross-sectional area of the GPF 14 can be ensured.

The outlet-side barrel portion 38 guides the exhaust gas G that has passed through the GPF 14 to the exhaust tube (not shown) for discharging the exhaust gas G to the outside. The outlet-side barrel portion 38 is formed by joining two metallic plate members, which are formed so as to be symmetric along the flowing direction of the exhaust gas G, by the welding, etc.

The air-fuel ratio sensor 40 has a bar-shaped member, and a measuring portion 41 for performing measurement on the exhaust gas G is provided on a tip end of the bar-shaped member. A main body portion of the air-fuel ratio sensor 40 is attached to a flat surface portion 31d provided on the inlet-side barrel portion 31 from the outside of the case 30 such that the measuring portion 41 is located in the flow path between the TWC 12 and the GPF 14. A detailed attachment position of the air-fuel ratio sensor 40 will be described later in detail.

Next, a more detailed configuration of the inlet-side barrel portion 31 will be described. In the following, the direction in which the exhaust gas G passes through the TWC 12, in other words, the axial direction of the TWC 12 is referred to as "a first direction P", and the direction in which the exhaust gas G passes through the GPF 14, in other words, the axial direction of the GPF 14 is referred to as "a second direction Q" (see FIG. 5). In this embodiment, although an example in which the first direction P intersects with the second direction Q perpendicularly is described, they do not necessarily intersect perpendicularly with each other, and it suffices that the first direction P intersects with the second direction Q.

The inlet-side barrel portion 31 is further provided with: a diverting portion 33 that is provided on an inner wall surface 31c of the inlet-side barrel portion 31 receiving the exhaust gas G that has passed through the TWC 12 and that diverts a part of the exhaust gas G that has passed through the TWC 12 so as to guide it to the GPF 14; and a guide portion 32 that guides the remaining of the exhaust gas G, which has been diverted by the diverting portion 33, to the outer circumference flow path 35.

The diverting portion 33 is formed to have a shape in which a part of a barrel wall protrudes radially inward at the outer side of the flowing direction of the exhaust gas G in the inlet-side barrel portion 31. An angle α formed by a top part 33a of the diverting portion 33 is preferably from about 70° to 120°. If the angle α is smaller than 70°, the processing of the inlet-side barrel portion 31 becomes difficult. On the other hand, if the angle α is larger than 120°, there is a risk in that sufficient flow amount of the exhaust gas G to be guided to the outer circumference flow path 35 may not be ensured.

As shown in FIG. 5, the guide portion 32 has: a tilted portion 32a that is tilted by a predetermined angle θ with respect to a flat plane X orthogonal to the first direction P from the diverting portion 33 towards the downstream side in the first direction P; and a curved portion 32b that guides the exhaust gas G that has passed through the tilted portion 32a to the outer circumference flow path 35.

The tilted portion 32a is formed to have a substantially flat surface such that the predetermined angle θ between a flat plane Y including the tilted portion 32a and the flat plane X falls within a range from 3° to 20°. By setting the predetermined angle θ to such an angle, it is possible to guide the exhaust gas G that has been diverted by the diverting portion 33 to the curved portion 32b gradually and to guide the exhaust gas G to the outer circumference flow path 35 along the inner wall surface 31c of the case 30. Thus, it is possible to smoothly guide the exhaust gas G to the outer circumference flow path 35 without disturbing the flow of the exhaust gas G towards the diverting portion 33 through the TWC 12.

In addition, when the TWC 12 and the GPF 14 are viewed from the direction perpendicular to the first direction P and the second direction Q (see FIG. 4, in the following, also referred to as "a third direction R") (the state shown in FIG. 5), both ends of the TWC 12 in the first direction P are located between both ends of the GPF 14 in the first direction P (see FIGS. 4 and 5). With such a configuration, because the TWC 12 does not project outwards from the GPF 14 in the first direction P, it is possible to reduce the size of the exhaust gas processing device 10.

Next, the flow of the exhaust gas G in the exhaust gas processing device 10 will be described.

As shown in FIG. 5, the exhaust gas G that has entered from the exhaust inlet 11a of the inlet-side flange 11 is guided to the TWC 12 through the diffuser portion 25. For the exhaust gas G that has entered the TWC 12, the hydrocarbons and carbon monoxide contained therein are oxidized and degraded to carbon dioxide and water, and at the same time, the nitrogen oxides is reduced.

The exhaust gas G that has passed through the TWC 12 is divided by the diverting portion 33 that is formed on the inner wall surface 31c of the inlet-side barrel portion 31 into a flow directly directed to an upstream-side end surface 14b of the GPF 14 and a flow directed to the outer circumference flow path 35 through the guide portion 32.

The flow directly directed to the upstream-side end surface 14b of the GPF 14 forms a main flow of the exhaust gas G, and it flows into the upstream-side end surface 14b of the GPF 14 directly by being redirected by the diverting portion 33 by an angle of about 90° without being diverted to the outer circumference flow path 35.

The exhaust gas G that has entered the outer circumference flow path 35 through the guide portion 32 flows towards the upstream-side end surface 14b of the GPF 14 along the outer circumferential surface 20a of the inner case 20 (see FIG. 7). At this time, the exhaust gas G flowing through the outer circumference flow path 35 heats the TWC 12 from the outer circumference via the inner case 20. By guiding the exhaust gas G to the outer circumference flow path 35 as described above, temperature of the TWC 12 can be increased within a short period of time soon after the engine has started, and therefore, it is possible to achieve activation of the TWC 12. Especially, because a downstream-side portion in the first direction (a downstream-side end surface 12c side), where the temperature of the TWC 12 tends not to be raised, can be heated from the outer circumference, it is possible to shorten the time required for activating the TWC 12.

The TWC 12 is accommodated, over the entirety in the first direction P, in the inner case 20 that is provided within the case 30 and faces the inlet-side barrel portion 31 such that the outer circumference flow path 35 is sandwiched therebetween. As described above, by providing the TWC 12 in the inner case 20 over the entirety, the exhaust gas G flowing through the outer circumference flow path 35 heats the TWC 12 from the outer circumference but not flowing into the TWC 12. With such a configuration, a heat insulating effect can be achieved for the TWC 12, and it is possible to improve the cleaning function of the catalyst. In addition, by providing such a double tube structure that is formed with the case 30 and the inner case 20, it is possible to effectively prevent escape of the heat to the outside of the case 30. It also has an effect that it is possible to reduce resistance in the flow path of the exhaust gas G directed from the outer circumference flow path 35 to the GPF 14 because the exhaust gas G flowing through the outer circumference flow path 35 does not flows into the TWC 12 by covering the TWC 12 by the inner case 20. In addition, because the exhaust gas G flowing through the outer circumference flow path 35 does not flow into the TWC 12, the flow of the exhaust gas G flowing in the TWC 12 towards the first direction P is prevented from being disturbed. Furthermore, by providing the TWC 12 in the inner case 20 over the entirety, the exhaust gas G that has entered the TWC 12 is caused to pass through the whole region of the TWC 12, and therefore, it is possible to further clean the exhaust gas G. With such a configuration, it is possible to reduce the whole length of the TWC 12.

As described above, the exhaust gas G that has passed through the outer circumference flow path 35 enters the GPF 14 after joined, in a space 16 between the outer circumferential surface 20a of the inner case 20 and the upstream-side end surface 14b of the GPF 14 in the inlet-side barrel portion 31, with the flow directly directed to the upstream-side end surface 14b of the GPF 14 that has been diverted by the diverting portion 33.

The fine particulate matters are removed from the exhaust gas G that has entered the GPF 14, and the exhaust gas G is then discharged to the exhaust tube through the outlet-side barrel portion 38.

Figure 8:
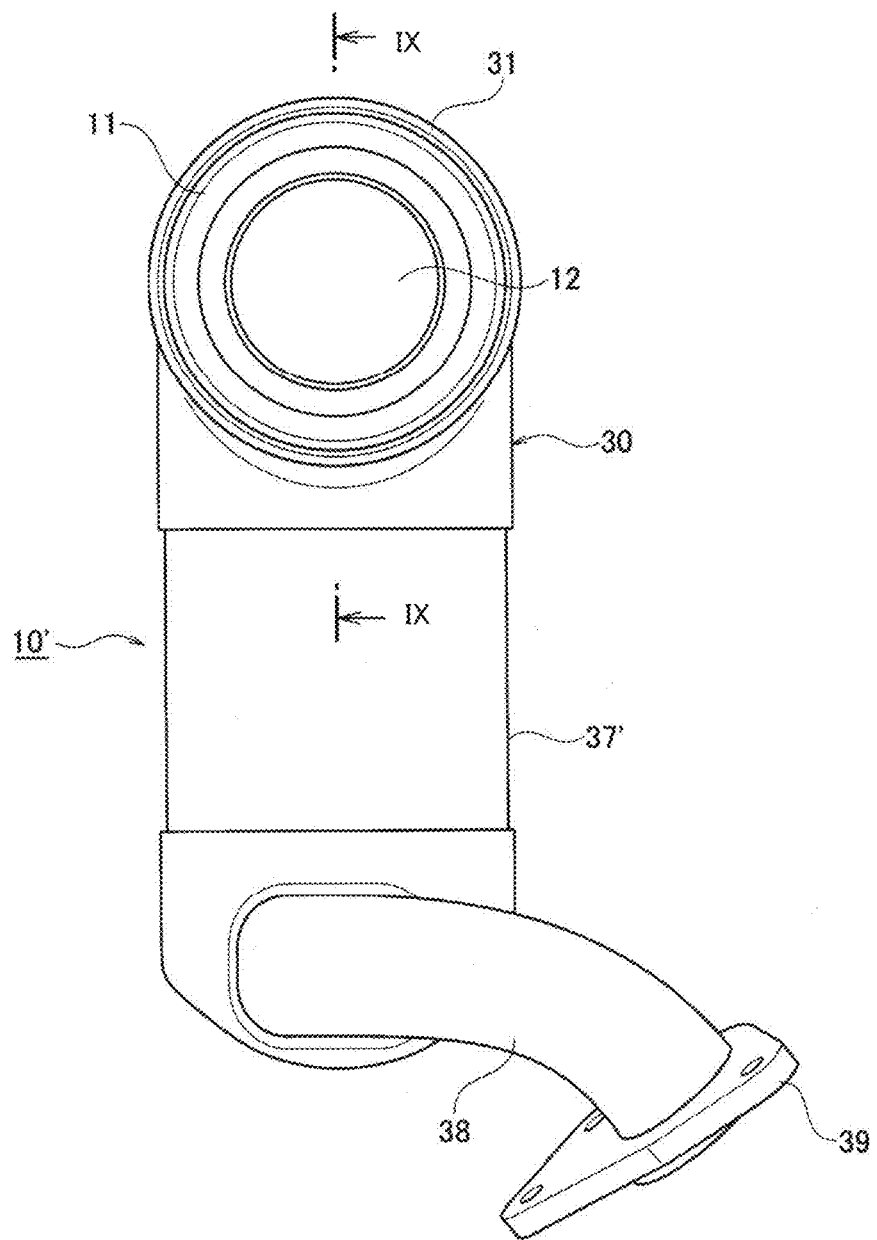
FIG. 8 is a front view of the exhaust gas processing device according to a modification of the first embodiment of the present invention.
Figure 9:
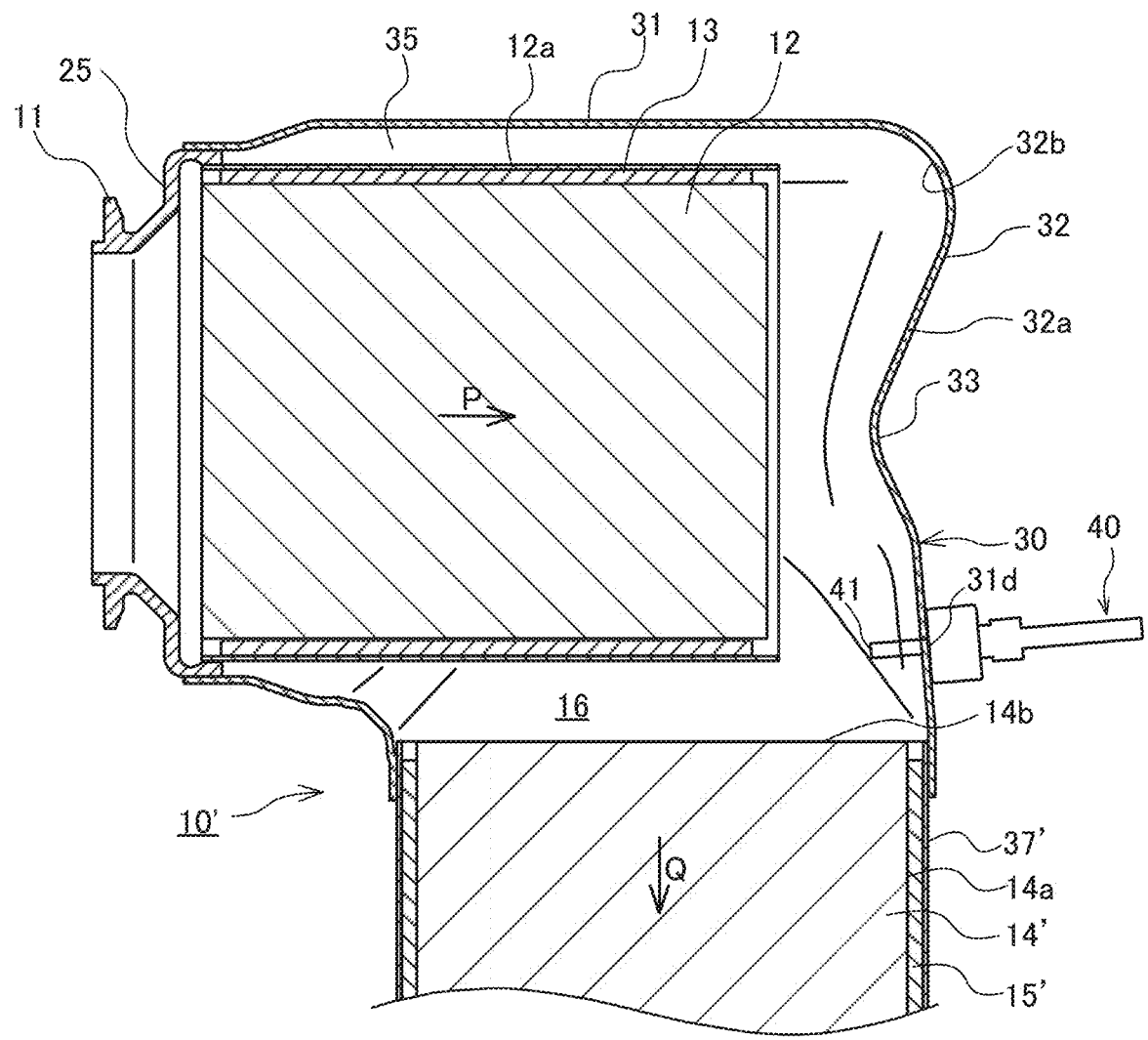
FIG. 9 is a sectional view taken along line IX-IX in FIG. 8.
Figure 10:
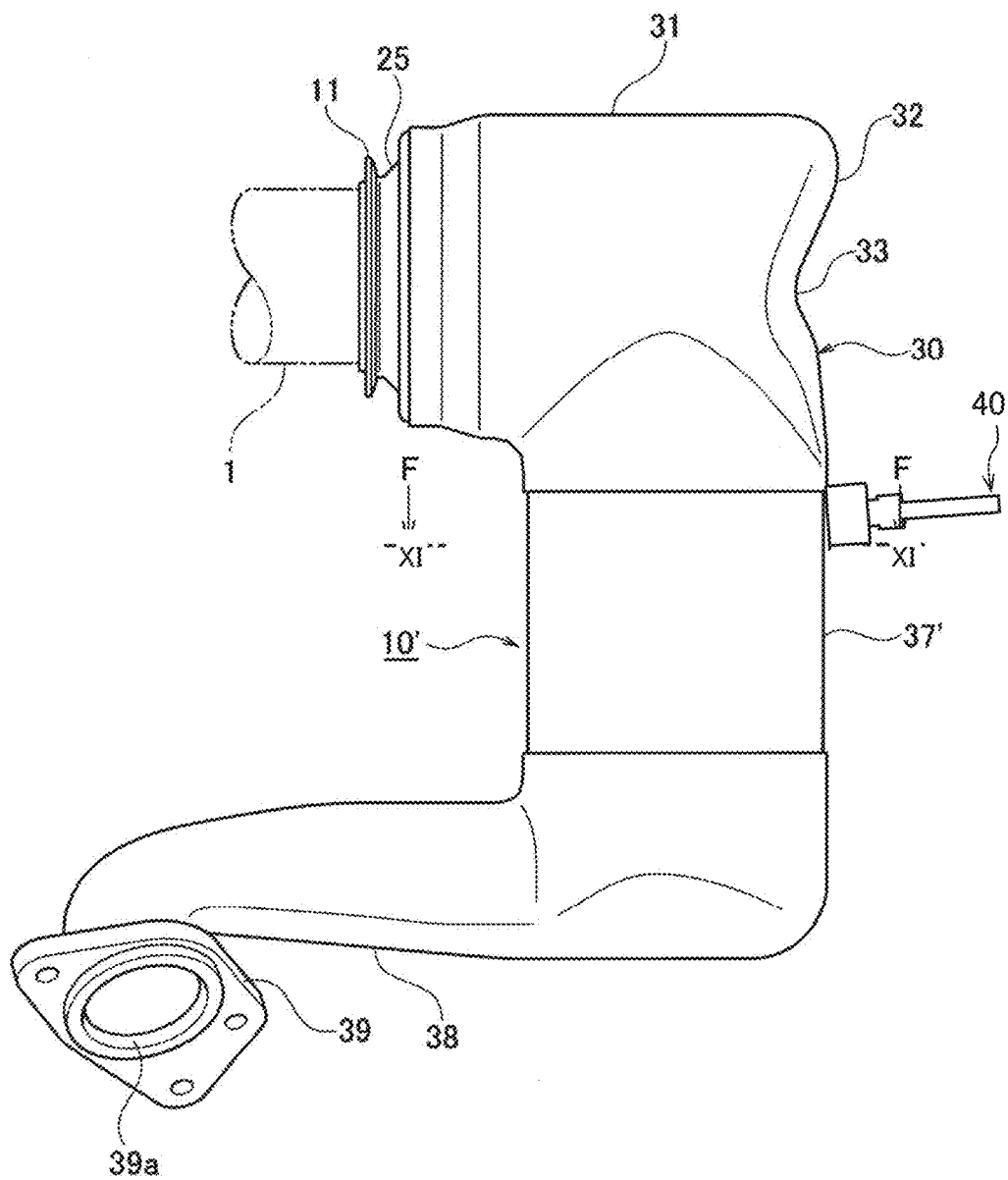
FIG. 10 is a side view of the exhaust gas processing device according to the modification of the first embodiment of the present invention.
Figure 11:
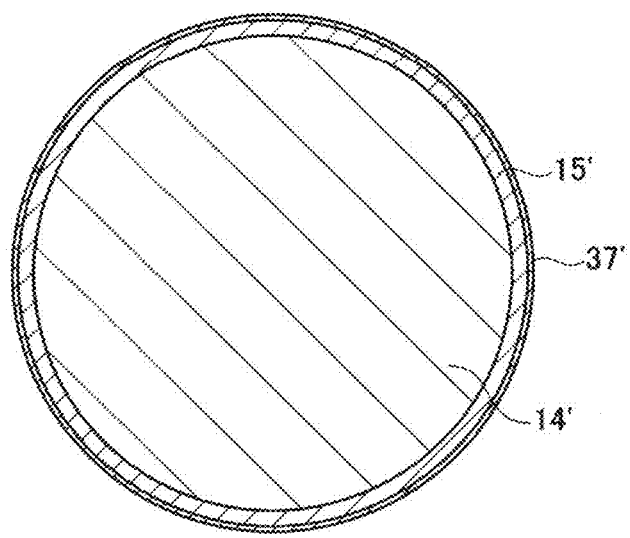
FIG. 11 is a sectional view taken along line XI-XI in FIG. 10.

Next, the exhaust gas processing device 10' according to a modification will be described with reference to FIGS. 8 to 11. FIG. 8 is a front view of the exhaust gas processing device 10'. FIG. 9 is a sectional view taken along line IX-IX in FIG. 8. FIG. 10 is a side view of the exhaust gas processing device 10', and FIG. 11 is a sectional view taken along line XI-XI in FIG. 10.

The modification shown in FIGS. 8 to 11 has a configuration in which the GPF 14' has a columnar shape. In this modification, as shown in FIGS. 9 and 10, because the lengths of the GPF 14' and the middle barrel portion 37' in the axial-line direction of the TWC 12 (the first direction P) are reduced, it is possible to reduce the size of the exhaust gas processing device 10' by an corresponding amount. As described above, even if the GPF 14' has the cylinder shape, as long as the flow-passage cross-sectional area of the GPF 14' can be ensured, it is possible to reduce the size of the exhaust gas processing device 10' by employing such a configuration.

Figure 12:
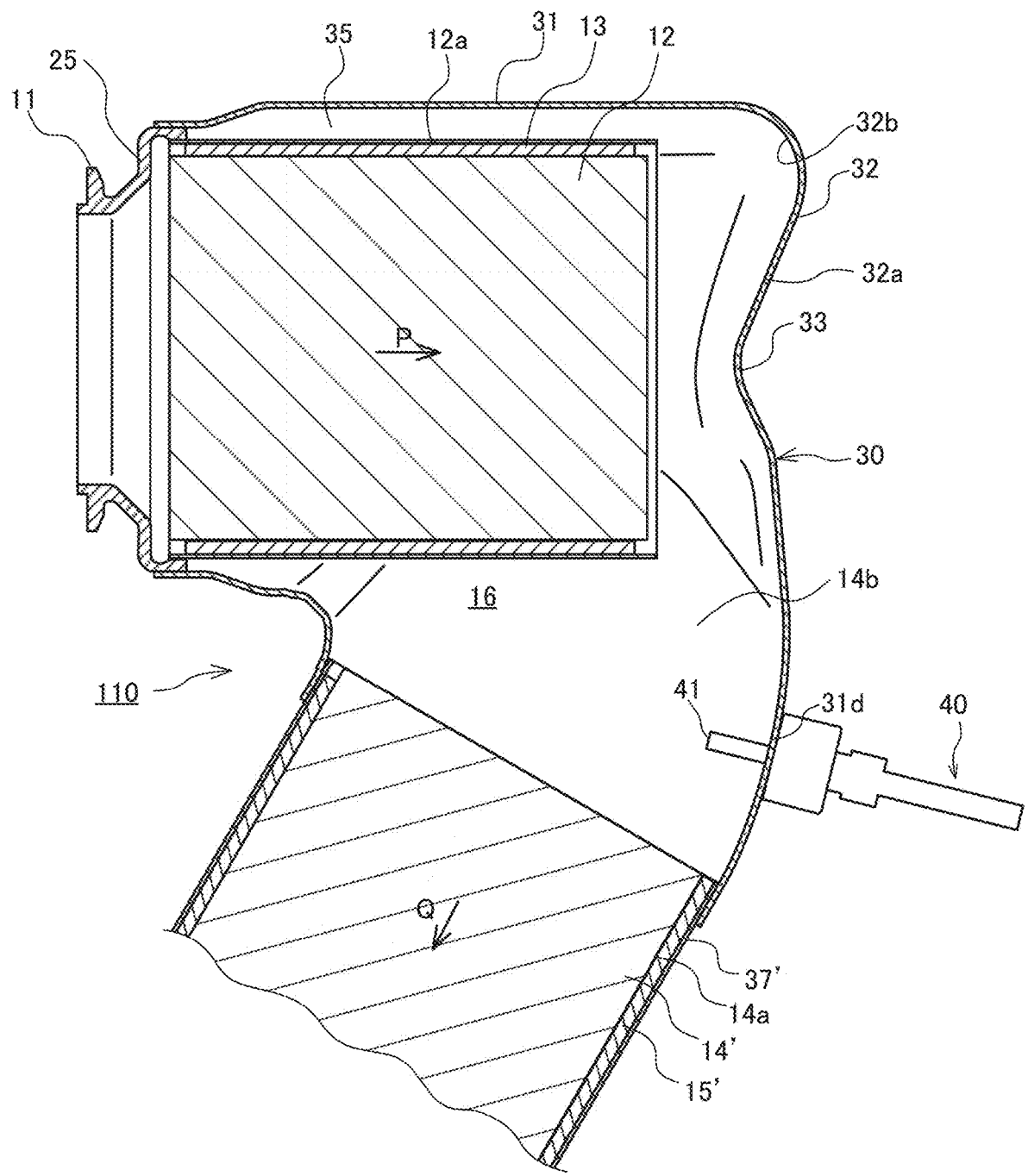
FIG. 12 is a side sectional view of the exhaust gas processing device according to another modification of the first embodiment of the present invention.

Next, an exhaust gas processing device 110 according to another modification will be described with reference to FIG. 12. FIG. 12 is a side sectional view of the exhaust gas processing device 110 according to another modification.

The modification shown in FIG. 12 is the exhaust gas processing device 110 in which the angle between the first direction P and the second direction Q is smaller than 90°. In the modification shown in FIG. 12, the GPF 14 and the middle barrel portion 37 can be arranged on the center side of the TWC 12 in the axial-line direction of the TWC 12 (the first direction P). With such a configuration, because the length of the TWC 12 in the axial-line direction (the first direction P) is reduced, it is possible to reduce the size of the exhaust gas processing device 10 by an corresponding amount.

Next, the detailed attachment position of the air-fuel ratio sensor 40 will be described with reference to FIGS. 13 and 14.

In the exhaust gas processing device 10 in this embodiment, a region in which the flow rate of the exhaust gas G flowing by following the contour of the inner wall surface 31c of the case 30 is high is formed in the flow path between the TWC 12 and the GPF 14, and the air-fuel ratio sensor 40 attached to the case 30 is provided such that the measuring portion 41 of the air-fuel ratio sensor 40 is located at a position in such a region at which the flow rate of the exhaust gas G is high relative to that at other positions.

The more specific attachment position of the air-fuel ratio sensor 40 will be described with reference to FIGS. 13 and 14. FIG. 13 shows a result of a simulation performed for the flow of the exhaust gas G directed from the TWC 12 to the GPF 14 in the exhaust gas processing device 10. FIG. 13 shows a distribution of the flow rate. In addition, FIG. 14 is a list of results of the simulations performed for the flow of the exhaust gas G directed from the TWC 12 to the GPF 14 in models corresponding to the exhaust gas processing device 10, 10', 110 each with/without the diverting portion 33.

Figure 13:
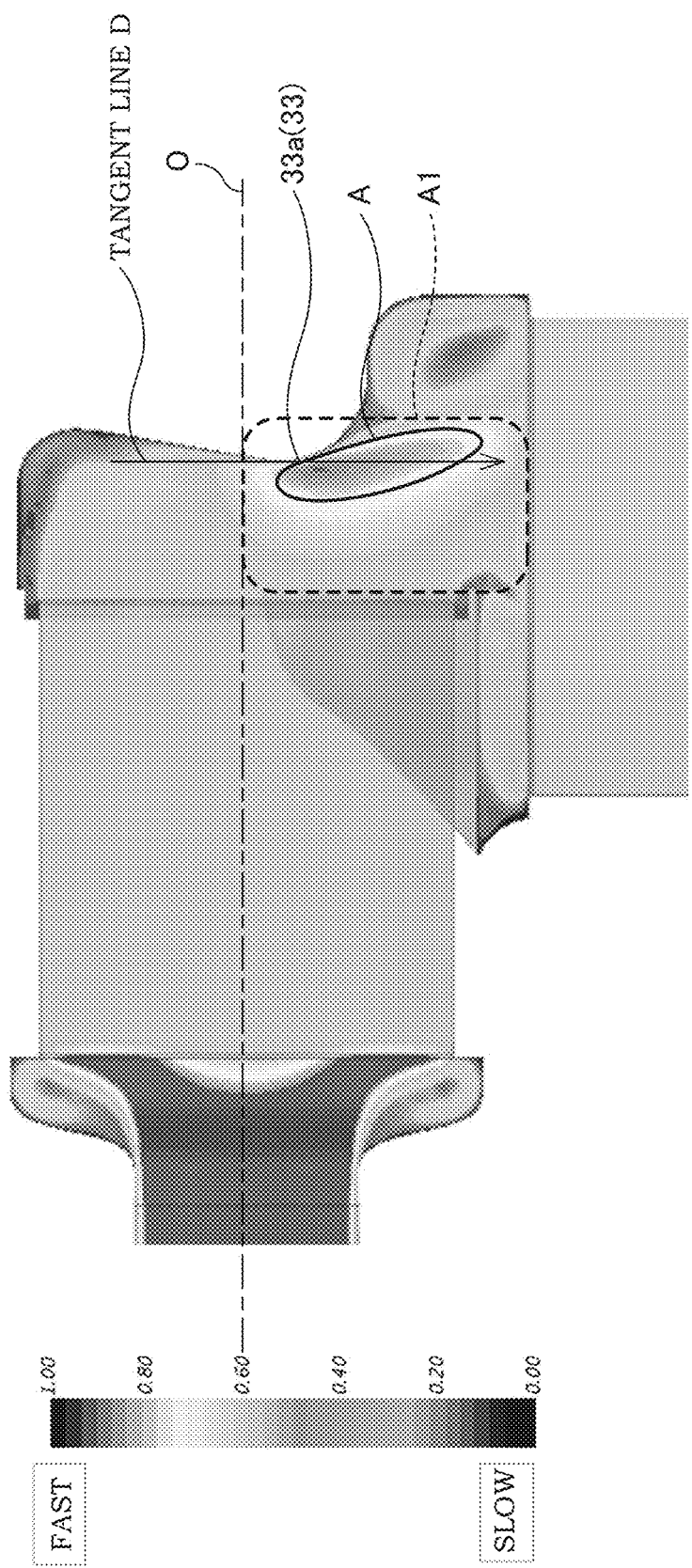
FIG. 13 is a diagram showing a result of a simulation performed for the flow of the exhaust gas from a first catalyst carrier towards a second catalyst carrier of the exhaust gas processing device according to the first embodiment of the present invention.
Figure 14:
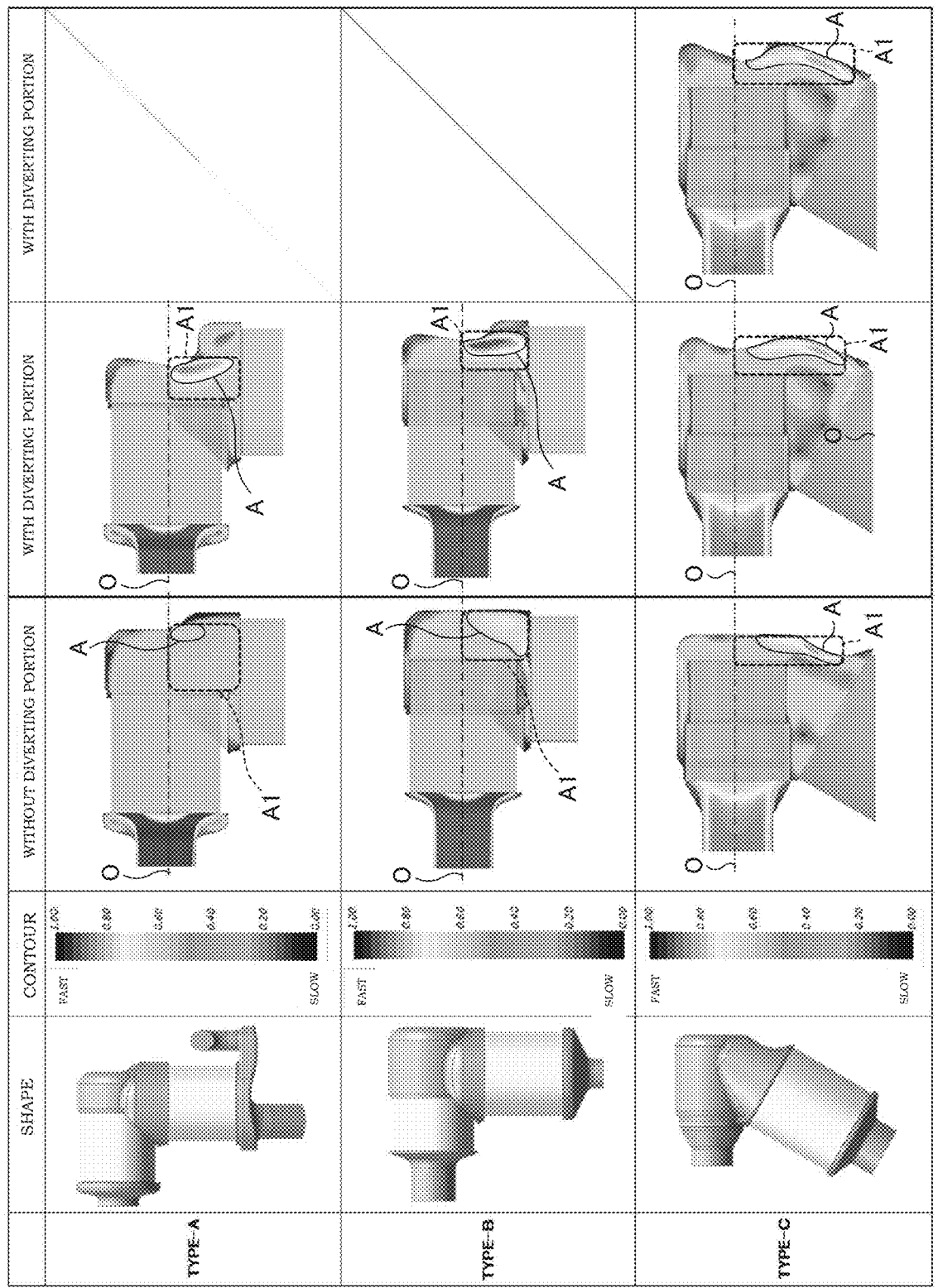
FIG. 14 is a diagram showing a list of results of the simulations performed for the flow of the exhaust gas from the first catalyst carrier to the second catalyst carrier in each of the exhaust gas processing devices in various conditions.

A dark colored portion in a portion (region A) defined by a thick line and a surrounding white portion in FIG. 13 are portions where the flow rate is especially high. The region A serving as a second region extends along the tangential direction D of the top part 33a that protrudes the most in the first direction P of the diverting portion 33 on the downstream side of the diverting portion 33.

Thus, in the exhaust gas processing device 10, the measuring portion 41 of the air-fuel ratio sensor 40 is attached to the inlet-side barrel portion 31 so as to be located in the region A. With such a configuration, it is possible to determine the oxygen concentration in the exhaust gas G that has passed through the TWC 12 with high accuracy by the air-fuel ratio sensor 40. As long as the above-described measuring portion 41 is located at the region A, the air-fuel ratio sensor 40 as described above may be inserted and fixed to the case 30 at any angle. The air-fuel ratio sensor 40 may be arranged so as to be inclined towards the TWC 12 or arranged so as to be inclined towards the GPF 14. However, it is preferable that the air-fuel ratio sensor 40 be arranged along the flowing direction of the exhaust gas G and that the measuring portion 41 be arranged so as to face down in the direction of the gravitational force such that adhesion of water droplets, etc. onto the measuring portion 41 is prevented. In the configurations shown in FIG. 5, etc., when the second direction Q is set as the top-bottom direction, it is preferable that the measuring portion 41 be arranged so as to face the GPF 14.

In a case in which there is a spatial limitation or a space for providing the flat surface portion 31d for attaching the air-fuel ratio sensor 40 to the inlet-side barrel portion 31 cannot be ensured (for example, when in the vicinity of a bonded portion 31e that is formed during fabrication of the inlet-side barrel portion 31 or in the vicinity of a curved portion of the inlet-side barrel portion 31), the air-fuel ratio sensor 40 may be attached to the inlet-side barrel portion 31 such that the measuring portion 41 of the air-fuel ratio sensor 40 is located at a region A1 serving as a first region (each of the regions shown by the thick lines in FIGS. 13 and 14) where the flow rate of the exhaust gas G is relatively high. In other words, it is preferable that the measuring portion 41 of the air-fuel ratio sensor 40 be arranged, in the space between the TWC 12 and the GPF 14, in the region at which the flow rate of the exhaust gas G is high by avoiding a region at which the flow rate of the exhaust gas G is the slowest. However, the present invention is not limited thereto, and for example, it is also possible to arrange the measuring portion 41 of the air-fuel ratio sensor 40 in a region at which a sensor sensitivity can be ensured (for example, surrounding regions, etc. close to the region at which the flow rate is the highest) by taking a limitation such as a fixing position, an installation space, and so forth for the main body portion of the air-fuel ratio sensor 40 into consideration.

The region A1 is a region surrounded by the downstream-side end surface 12c of the TWC 12, the upstream-side end surface 14b of the GPF 14, and the inner wall surface 31c of the inlet-side barrel portion 31 receiving the exhaust gas G that has passed through the TWC 12, and the region A1 is set towards the GPF 14 side from the center of the TWC 12. The center of the TWC 12 refers to a region having a flat plane including the center line O of the TWC 12 in the third direction R. In the region A1, because the flow of the exhaust gas G flowing from the TWC 12 towards the GPF 14 forms the main flow, the flow rate of the exhaust gas G becomes relatively high. Thus, by attaching the air-fuel ratio sensor 40 to the inlet-side barrel portion 31 such that the measuring portion 41 is located at the region A1, it is possible to measure the oxygen concentration in the exhaust gas G that has passed through the TWC 12 accurately. The region A1 described here is, in this embodiment, essentially surrounded by the downstream-side end surface 12c of the TWC 12, the upstream-side end surface 14b of the GPF 14, and the inner wall surface 31c receiving the exhaust gas G (the inner wall surface of the case 30 facing the downstream-side end surface 12c of the TWC 12), and the region A1 is the flow path (the space) for the exhaust gas G through which the exhaust gas G that has passed through the TWC 12 flows towards the GPF 14 side. Specifically, the region A1 is a flow path that extends from the space defined between a lower end surface of the downstream-side end surface 12c of the TWC 12 on the GPF 14 side and the inner wall surface 31c of the case 30 towards the upstream-side end surface 14b side of the GPF 14 along the surface direction of the downstream-side end surface 12c of the TWC 12. In addition, the inner wall surface 31c of the case 30 refers to a wall surface facing the downstream-side end surface 12c of the TWC 12 and may include, in addition thereto, a wall surface extending and approaching the GPF 14 side, and for example, the wall surface may be formed of a flat surface only or may be formed of a flat surface and a deformed surface.

In addition, because it is easy to form a boss at a position avoiding the bonded portion 31e, the air-fuel ratio sensor 40 may be attached to such a position.

The more specific attachment position of the air-fuel ratio sensor 40 will be described with reference to FIGS. 15A and 15B.

Figure 15A:
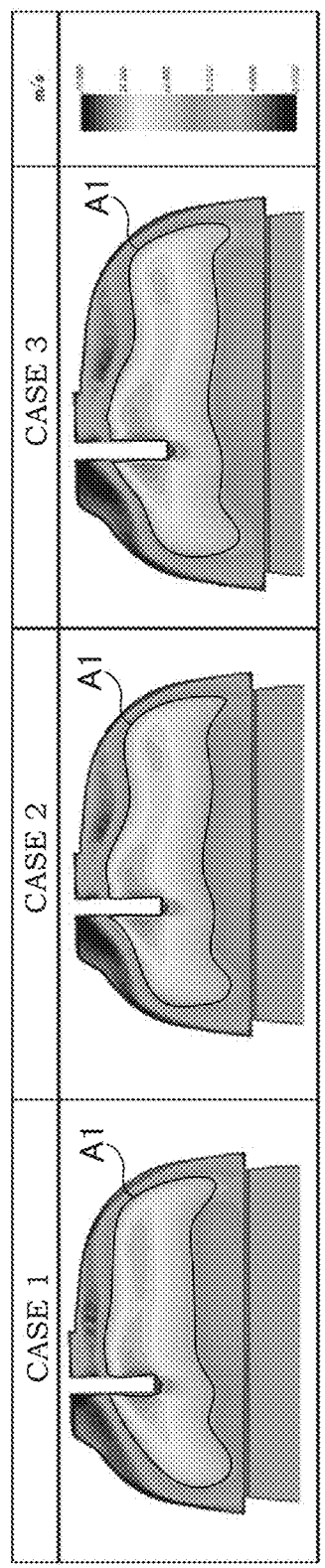
FIG. 15A is a diagram showing results of the simulations performed for the flow of the exhaust gas from the first catalyst carrier to the second catalyst carrier of the exhaust gas processing device.
Figure 15B:
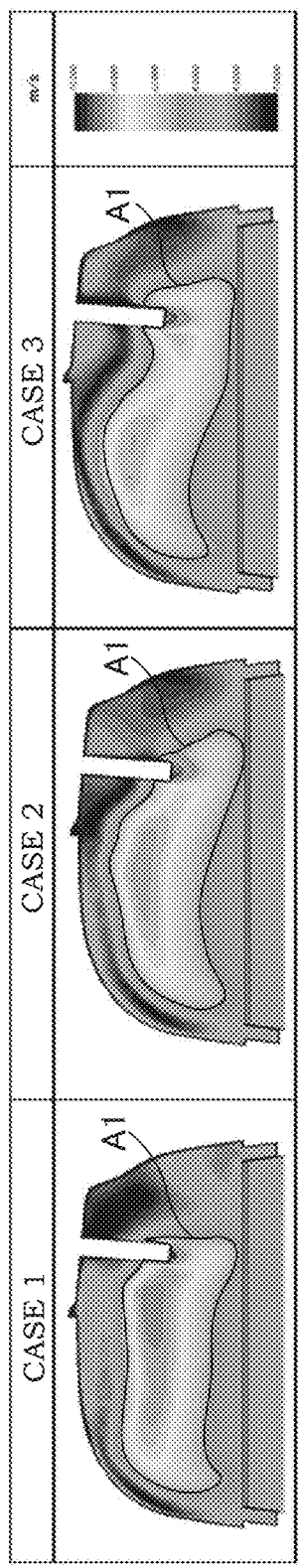
FIG. 15B is a diagram showing results of the simulations performed for the flow of the exhaust gas from the first catalyst carrier to the second catalyst carrier of the exhaust gas processing device.

FIGS. 15A and 15B show results of the simulations performed for the flow of the exhaust gas G at a cross section taken along line XV-XV in FIG. 1. A case 1, a case 2, and a case 3 in FIGS. 15A and 15B are results of the simulations performed at a low, a middle, and a high engine speed in this order. In addition, FIG. 15A shows a case in which the air-fuel ratio sensor 40 is attached at the position shown in FIG. 4, and FIG. 15B shows results of the simulations performed in a case in which the air-fuel ratio sensor 40 is attached to the opposite side from the position shown in FIG. 4 with respect to the bonded portion 31e.

As clearly seen from FIGS. 15A and 15B, even if the position is deviated from the center position of the inlet-side barrel portion 31 in the third direction R, there is the region at which the flow rate of the exhaust gas G is relatively high, in other words, there is the region A1. Thus, for example, even in a case in which the air-fuel ratio sensor 40 cannot be attached to the center of the inlet-side barrel portion 31 in the third direction R due to the presence of the bonded portion 31e for example, it is possible to determine the oxygen concentration in the exhaust gas G that has passed through the TWC 12 with high accuracy by attaching the air-fuel ratio sensor 40 to the inlet-side barrel portion 31 such that the measuring portion 41 is located in the region A1.

According to the above-described first embodiment, the following effects are afforded.

In the exhaust gas processing device 10 of this embodiment, while the size of the exhaust gas processing device 10 is reduced by arranging two catalysts (specifically, the TWC 12 and the GPF 14), which are provided for increasing the cleaning function for the exhaust gas G, such that they are superimposed with each other, the speed (the flow rate) of the main flow of the exhaust gas G flowing towards the GPF 14 side is increased while allowing the exhaust gas G that has passed through the TWC 12 to flow against the inner wall surface of the case 30, and the air-fuel ratio sensor 40 is provided such that the measuring portion 41 of the air-fuel ratio sensor 40 is located in the region A or the region A1 between the TWC 12 and the GPF 14 at which the flow rate of the exhaust gas G is high, and therefore, it is possible to achieve the exhaust gas processing device that is small-sized and having superior exhaust gas cleaning function, in which the air-fuel ratio sensor 40 for the determination of the exhaust gas G is capable of detecting numerical values with high accuracy.

In addition, in the exhaust gas processing device 10, when the TWC 12 and the GPF 14 are viewed from the direction intersecting with the first direction P and the second direction Q, both ends of the TWC 12 in the first direction P are positioned between both ends of the GPF 14 in the first direction P. With such a configuration, because the TWC 12 does not project outwards in the first direction P from the GPF 14, it is possible to reduce the size of the exhaust gas processing device 10. In addition, even in a case in which a heater (or the catalyst with the heater) is provided on the upstream side of the TWC 12 in the first direction P, it is possible to reduce the projecting amount of the heater (or the catalyst with the heater) in the first direction P. In other words, this embodiment may be the exhaust gas processing device 10 that is further provided with the heater for heating the exhaust gas G on the upstream side of the TWC 12. According to such a configuration, it is possible to heat the TWC 12 by utilizing the exhaust gas G as a medium, and so, the exhaust gas processing device that exhibits the superior exhaust gas cleaning function in a situation such as start of the engine is achieved. Because the TWC 12 is arranged so as to be superimposed with the GPF 14 in the first direction P, even if a configuration in which the TWC 12 is slightly projected out from the GPF 14 is employed, it is still possible to achieve the exhaust gas processing device having the superior exhaust gas cleaning function that is small in size as a whole.

Second Embodiment

Figure 16:
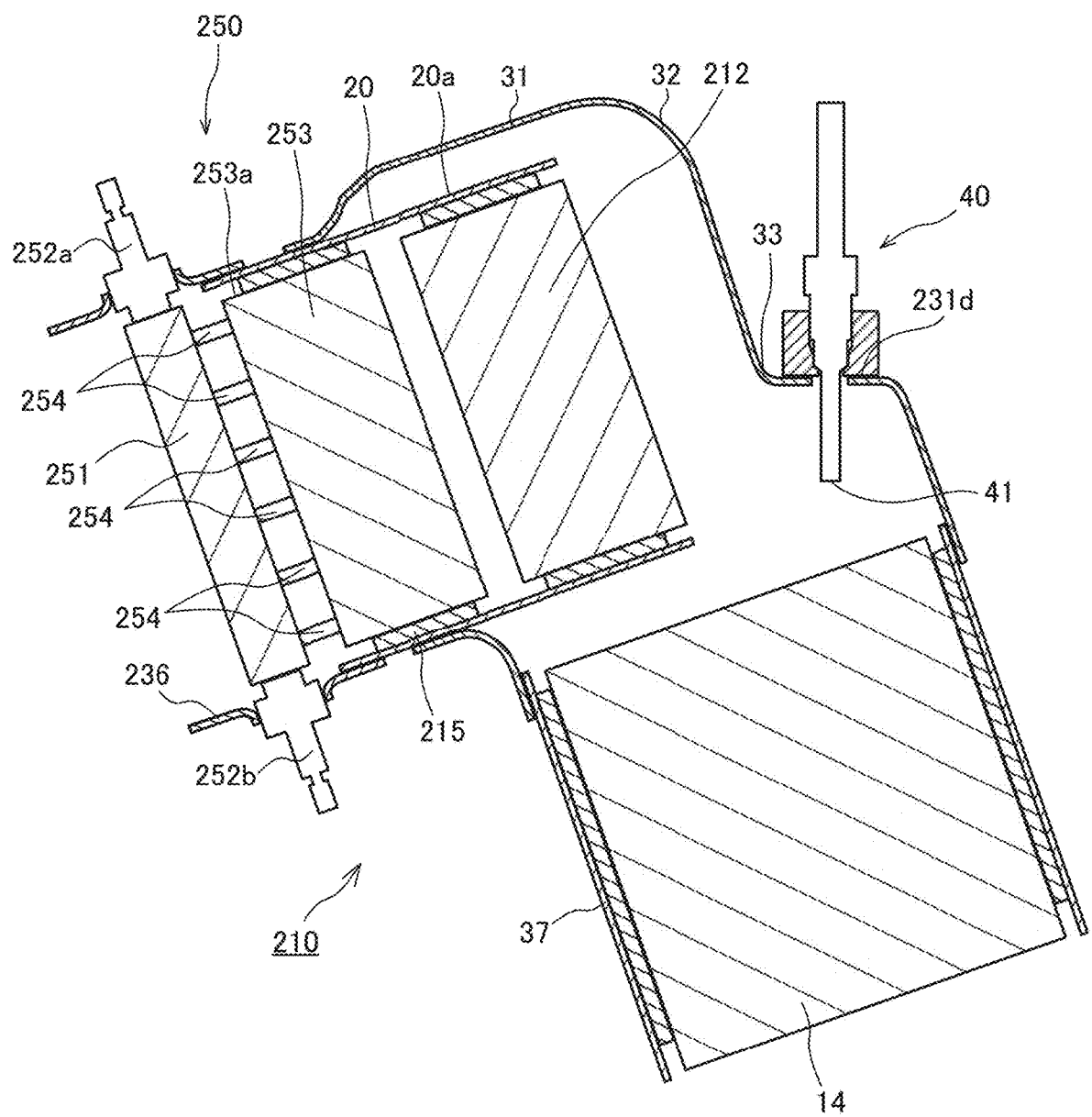
FIG. 16 is a side sectional view of the exhaust gas processing device according to a second embodiment of the present invention.

An exhaust gas processing device 210 according to a second embodiment of the present invention will be described with reference to FIG. 16. FIG. 16 is a side sectional view of the exhaust gas processing device 210 and is a diagram corresponding to a sectional view taken along the line V-V in FIG. 2. In the following, differences from the above-described first embodiment will be mainly described, and components that are the same as those in the exhaust gas processing device 10 in the first embodiment are assigned the same reference numerals and descriptions thereof will be omitted. In FIG. 16, illustration of the inlet-side flange 11, the diffuser portion 25, and the outlet-side barrel portion 38 are omitted.

The second embodiment differs from the above-described first embodiment in that an EHC (electrically heated catalyst) 250 is provided. Specifically, the exhaust gas processing device 210 is further provided with the EHC 250 that cleans the exhaust gas G on the upstream side of a TWC 212 that cleans the exhaust gas G. In addition, in the exhaust gas processing device 210, a flat surface portion 231d is provided in the vicinity of the diverting portion 33, and the air-fuel ratio sensor 40 is attached to the flat surface portion 231d. With such a configuration, it is possible to effectively prevent the adhesion of water droplets, etc. onto the measuring portion 41 of the air-fuel ratio sensor 40 in the case 30.

The EHC 250 is provided with a heater unit 251 having electrodes 252a and 252b and an electrode support 253 formed of a honeycomb structure body that supports the heater unit 251 and the electrodes 252a and 252b.

The heater unit 251 is a heater having a spiral shape for example, that generates heat by electric current applied to the electrodes 252a and 252b. The heater unit 251 is held in the extended barrel portion 236 by welding the electrodes 252a and 252b to an extended barrel portion 236 that is fixed to the outer circumferential surface 20a of the inner case 20 by welding.

The electrode support 253 is held in the inner case 20 such that its outer circumferential surface 253a is located on the upstream side of the TWC 12 via a cushioning material 215.

A plurality of pins 254 for maintaining a space between the heater unit 251 and the electrode support 253 and for holding the heater unit 251 and the electrodes 252a and 252b are provided between the heater unit 251 and the electrode support 253. The plurality of pins 254 are provided between the heater unit 251 and the electrode support 253 so as to be inserted to each of the heater unit 251 and the electrode support 253.

In the exhaust gas processing device 210, at the time of cold start (at the time of cold start) during the start of the engine, by applying the electric current through the heater unit 251 via the electrodes 252a and 252b, the heating is performed until the temperature of the exhaust gas G flowing in the extended barrel portion 236 is increased to 200° C. to 300° C., and thus heated exhaust gas G is utilized to heat the TWC 212. With such a configuration, it is possible to cause catalyst component in the TWC 212 to reach the activation temperature within a short period of time. As described above, in the exhaust gas processing device 210, because the activation of the catalyst component in the TWC 212 can be achieved within a short period of time, it is possible to improve the cleaning function during the start of the engine.

As shown in FIG. 16, in the exhaust gas processing device 210, when the TWC 212 and the GPF 14 are viewed from the third direction R, both ends of the TWC 212 in the first direction P are formed so as to be located between both ends of the GPF 14 in the first direction P. With such a configuration, even in a case in which a space for providing the exhaust gas processing device 210 is limited, it is possible to secure a space for providing the EHC 250. In other words, by employing the above-described configuration, it is possible to suppress an increase in size of the exhaust gas processing device 210.

In the above-mentioned embodiment, a description has been given, as an example, of a configuration in which a single heater unit 251 is provided; however, a plurality of the heater units 251 may be provided in the exhaust gas processing device 210.

According to the above-described second embodiment, the following effects are afforded.

With the exhaust gas processing device 210, because the EHC 250 is provided, it is possible to achieve the activation of the catalyst component in the TWC 212 within a short period of time. With such a configuration, it is possible to improve the cleaning function during the start of the engine.

In the exhaust gas processing device 210, when the TWC 212 and the GPF 14 are viewed from the third direction R, both ends of the TWC 212 in the first direction P are formed so as to be located between both ends of the GPF 14 in the first direction P. With such a configuration, even in a case in which a space for providing the exhaust gas processing device 210 is limited, it is possible to secure a space for providing the EHC 250. In a case in which, for example, there is a spatial limitation for providing the exhaust gas processing device 210, the EHC 250 may not be provided. For example, it may be possible to employ a configuration in which the TWC 212 or the GPF 14 is heated directly by providing a metallic layer on the outer circumferential surface of the TWC 212 or the GPF 14 and by supplying electricity externally. With such a configuration, by heating the TWC 212 or the GPF 14, it is possible to realize the activation of the catalyst component within a short period of time while omitting the space for providing the EHC 250. In such a case, the TWC 212 or the GPF 14 may be formed of, for example, a honeycomb carrier having an electrical conductivity, and it may be formed of, as a material therefor, a metal or ceramics as long as the electrical conductivity is imparted (an electric current path is formed).

Next, an exhaust gas processing device 310 that is a first modification of the exhaust gas processing device 210 will be described with reference to FIGS. 17 to 19.

Figure 17:
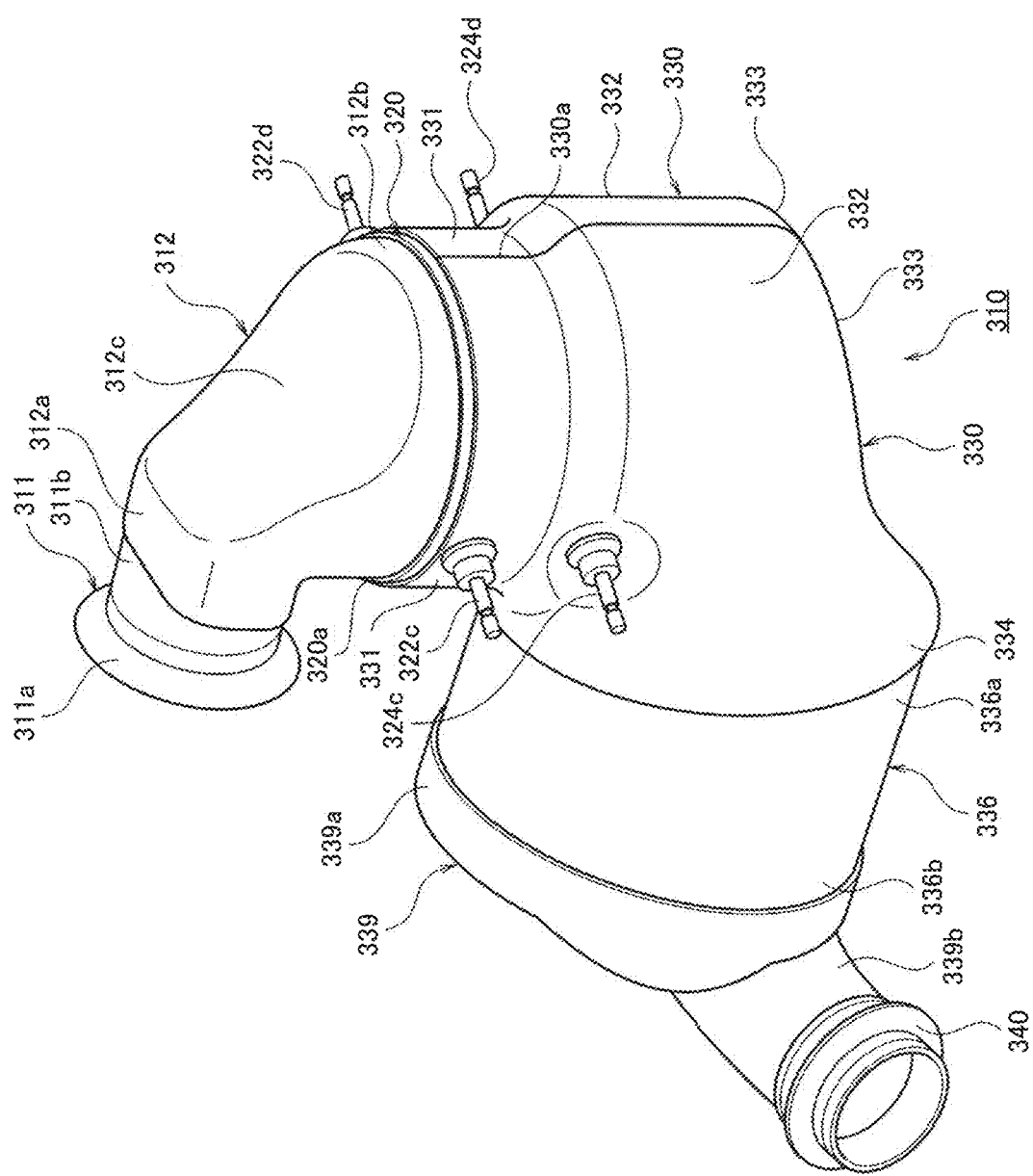
FIG. 17 is a perspective view of the exhaust gas processing device according to a modification of the second embodiment.
Figure 18:
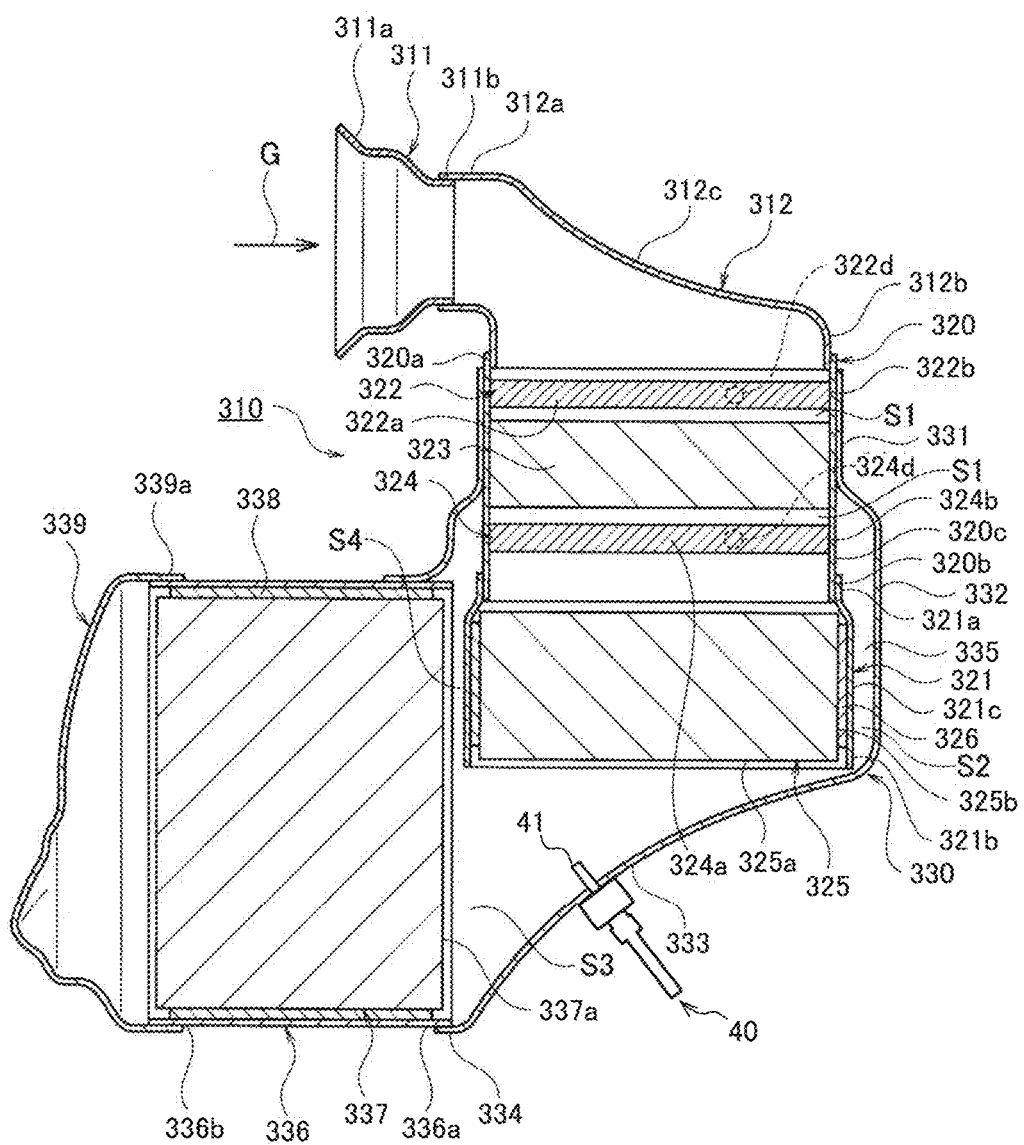
FIG. 18 is a sectional view of the exhaust gas processing device according to the modification of the second embodiment.
Figure 19:
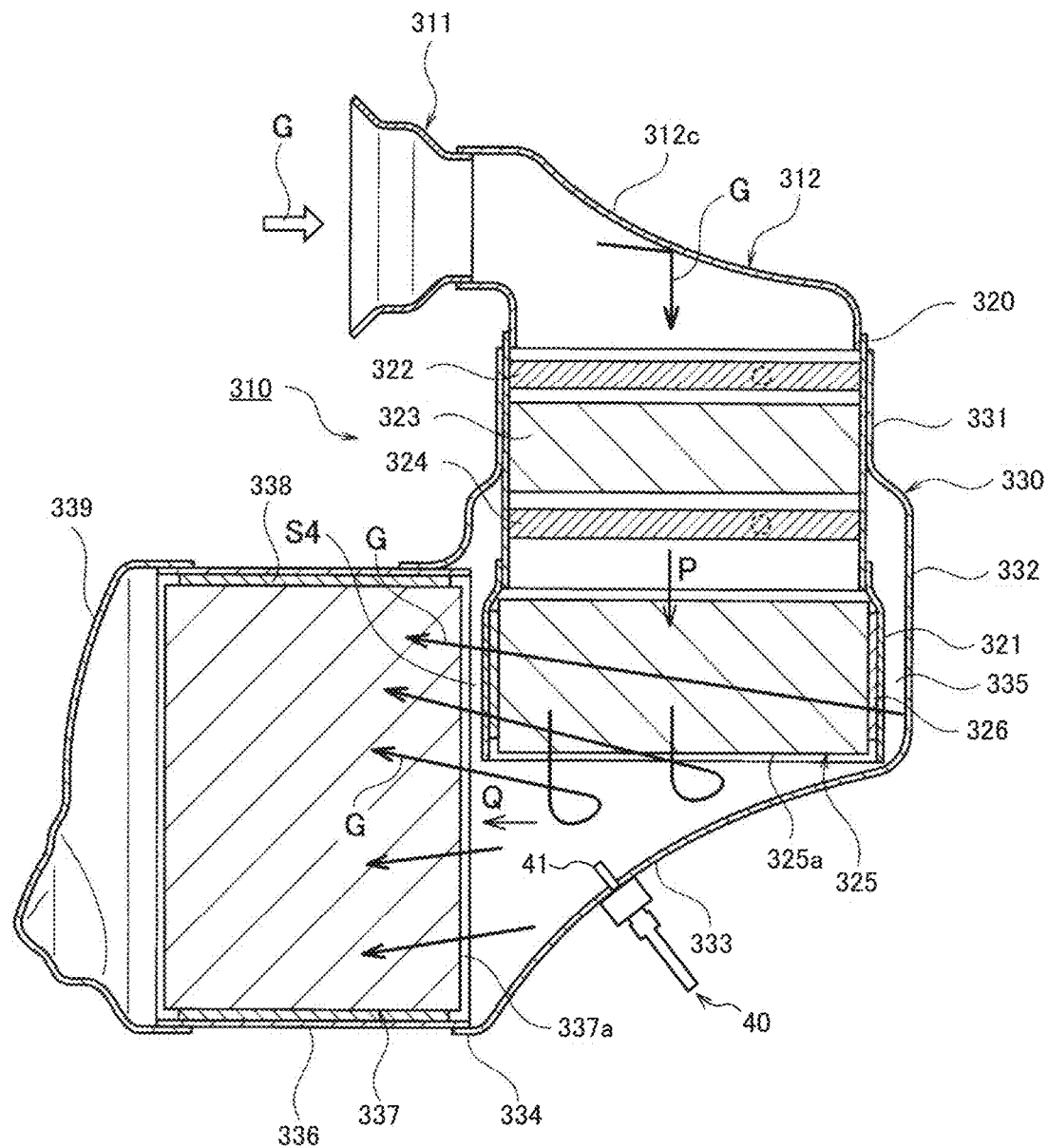
FIG. 19 is a sectional view showing the flow of the exhaust gas in the exhaust gas processing device according to the modification of the second embodiment.

FIG. 17 is a perspective view showing the exhaust gas processing device 310 of the first modification, FIG. 18 is a sectional view of the exhaust gas processing device 310, and FIG. 19 is a sectional view showing the flows of the exhaust gas in the case of the exhaust gas processing device 310.

As shown in FIG. 19, the exhaust gas processing device 310 is provided with: a pair of TWCs 323 and 325 through which the exhaust gas G flows along the first direction P and that cleans the exhaust gas G; a first electrically heated catalyst (EHC) 322 and a second electrically heated catalyst (EHC) 324 through which the exhaust gas G flows along the first direction P and that cleans the exhaust gas G; a first inner tube 320 that holds the EHC 322 and the EHC 324; a second way catalyst (TWC) 337 serving as the second catalyst carrier through which the exhaust gas G flows along the second direction Q and that cleans the exhaust gas G that has passed through the pair of the TWCs 323 and 325; and a first outer tube 330 and a second outer tube 336 each serving as a case that accommodates the EHC 322, the EHC 324, the pair of the TWCs 323 and 325, and the TWC 337.

More specifically, as shown in FIGS. 17 to 19, the exhaust gas processing device 310 is located on the upstream side of an exhaust passage of the exhaust gas turbine side of a turbocharger, and is provided with: a metallic inlet tube 311 that is attached to an inlet-side flange (not shown); a metallic diffusion tube 312; the first inner tube 320 serving as a metallic cylinder-shaped inner case and a second inner tube 321 serving as a metallic cylinder-shaped inner case; the first outer tube 330 serving as a metallic case that covers the first and second inner tubes 320 and 321; the second outer tube 336 serving as a metallic cylinder-shaped case; and a metallic outlet tube 339.

As shown in FIGS. 17 and 18, the inlet tube 311 has an inlet-side tube portion 311a that is formed to have a conical step surface shape, the diameter of which is gradually decreased, and an outlet-side tube portion 311b that extends from the inlet-side tube portion 311a so as to have a laterally-elongated oval barrel shape. In addition, the diffusion tube 312 has: an inlet-side tube portion 312a that is formed to have a laterally-elongated oval barrel shape; an outlet-side tube portion 312b that is formed to have a large-diameter cylinder shape by being rotated by 90° with respect to the inlet-side tube portion 312a; and a tilted curved portion 312c that is formed between the inlet-side tube portion 312a and the outlet-side tube portion 312b and that redirects the exhaust gas G that has entered from the inlet tube 311 by 90° and causes it to flow towards the first inner tube 320 side. Furthermore, an end portion of the outlet-side tube portion 311b of the inlet tube 311 is fitted into and welded to the inlet-side tube portion 312a of the diffusion tube 312.

As shown in FIG. 18, an end portion of the outlet-side tube portion 312b of the diffusion tube 312 is fitted into and welded to an inlet-side opening end portion 320a of the metallic cylinder-shaped first inner tube 320. In addition, an outlet-side opening end portion 320b of the first inner tube 320 is fitted into and welded to an inlet-side opening end portion 321a of the metallic cylinder-shaped second inner tube 321. An outlet-side opening end portion 321b of the second inner tube 321 is formed to have a diameter slightly larger than that of the inlet-side opening end portion 321a.

A disc shaped first electrically heated catalyst 322 is held by being accommodated on the inlet-side opening end portion 320a side (the upstream side) in an interior of the first inner tube 320. The first electrically heated catalyst 322 is provided to speed up the activation by heating an electrically heated catalyst carrier 322a for cleaning the exhaust gas G by applying the electric current from an anode 322c to a cathode 322d. In addition, a columnar-shaped first three way catalyst (TWC) 323 that cleans the exhaust gas G is held by being accommodated in the center of the interior of the first inner tube 320. Furthermore, a disc shaped second electrically heated catalyst 324 is held by being accommodated on the outlet-side opening end portion 320b side (the downstream side) in the interior of the first inner tube 320. The second electrically heated catalyst 324 is provided to speed up the activation by heating an electrically heated catalyst carrier 324a for cleaning the exhaust gas G by applying the electric current from an anode 324c to a cathode 324d. The electrical insulation between the first electrically heated catalyst 322 and the first three way catalyst 323 and the electrical insulation between the first three way catalyst 323 and the second electrically heated catalyst 324 are each achieved by a spacing S1.

In addition, a columnar-shaped first three way catalyst (TWC) 325 serving as the TWC cleaning the exhaust gas G is held by being accommodated via a cylinder-shaped cushioning material 326 in an interior of the second inner tube 321 on the downstream side. In other words, the first electrically heated catalyst 322, the first three way catalyst 323 on the one side (on the upstream side), the second electrically heated catalyst 324, and the first three way catalyst 325 on the other side (on the downstream side) are each provided in this order from the upstream side of the exhaust passage in a tube member formed of the first inner tube 320 and the second inner tube 321. With such a configuration, the second electrically heated catalyst 324 is provided between the pair of first three way catalysts 323 and 325.

As shown in FIG. 17, the metallic first outer tube 330 is formed so as to be divided into a left part and a right part and is formed to have a L-shaped barrel shape when viewed from the side by joining the parts by overlapping and welding at a center portion 330a. More specifically, as shown in FIGS. 17 and 18, the first outer tube 330 has: a cylinder-shaped small-diameter barrel portion 331 that extends to the vicinity of the inlet-side opening end portion 320a of the first inner tube 320 and that is welded to an outer circumferential surface 320c of the first inner tube 320; a large-diameter barrel portion 332 that extends from the small-diameter barrel portion 331 towards the downstream side so as to form an outer circumference flow path 335, through which the exhaust gas G flows, by forming a spacing S2 from the center of the outer circumferential surface 320c of the first inner tube 320 to the outlet-side opening end portion 321b of an outer circumferential surface 321c of the second inner tube 321; a tilted curved portion 333 that guides a part of the exhaust gas G that has passed through the pair of first three way catalysts 323 and 325 to the outer circumference flow path 335 and that redirect the remaining of the exhaust gas G that has passed through the pair of first three way catalysts 323 and 325 towards the columnar-shaped second way catalyst (TWC) 337 serving as the second catalyst carrier, which will be described later; and a large-diameter outlet-side cylinder portion 334 into which an inlet-side opening end portion 336a of the second outer tube 336, which will be described later, is fitted and welded together. The large-diameter outlet-side cylinder portion 334 is provided so as to be located by being rotated by 90° with respect to the small-diameter barrel portion 331.

As shown in FIGS. 18 and 19, the large-diameter barrel portion 332 of the first outer tube 330 extends substantially parallel with the outer circumferential surface 320c of the first inner tube 320 and the outer circumferential surface 321c of the second inner tube 321 to form a double layer structure (so called the double tube structure), and thereby, the outer circumference flow path 335 is formed between the large-diameter barrel portion 332 and the respective outer circumferential surfaces 320c and 321c of the first inner tube 320 and the second inner tube 321. The outer circumference flow path 335 communicates with a spacing S3 of the outlet-side cylinder portion 334 over the entire circumference thereof, from which an exhaust main flow of the exhaust gas G flows out from a downstream-side end surface 325a of the first three way catalyst 325 on the downstream side, and the outer circumference flow path 335 extends from the position of the downstream-side end surface 325a of the above-described first three way catalyst 325 in the opposite direction towards the upstream of the exhaust main flow so as to form a cylinder shape.

In addition, as shown in FIGS. 18 and 19, surfaces (surfaces on the front side) of the outer circumferential surface 320c of the first inner tube 320 and the outer circumferential surface 321c of the second inner tube 321 that do not form the outer circumference flow path 335 are located so as to face an upstream-side end surface 337a of the second way catalyst 337 via a spacing S4 such that the first three way catalyst 325 on the downstream side and the second way catalyst 337 are arranged to form a so-called T-shape. Thereby, a part of the exhaust gas G that has passed through the pair of first three way catalysts 323 and 325 flows around to the outer circumference flow path 335 so as to flow into the upstream-side end surface 337a of the second way catalyst 337. In other words, a part of the exhaust gas G that has passed through the pair of first three way catalysts 323 and 325 is guided to the outer circumference flow path 335 along the upper side of the tilted curved portion 333. Furthermore, the exhaust gas G in the main flow that has passed through the pair of first three way catalysts 323 and 325 is redirected by about 90° at the spacing S3 in the lower side of the tilted curved portion 333 through which the exhaust main flow flows out such that the main flow flows into the upstream-side end surface 337a of the second way catalyst 337 directly without flowing around to the outer circumference flow path 335.

As shown in FIG. 18, the second outer tube 336 is formed of metal and formed to have a cylinder shape, and the columnar-shaped second way catalyst (TWC) 337 serving as the second catalyst carrier is accommodated and held inside the second outer tube 336 via a cylinder-shaped cushioning material 338. In addition, a large-diameter cylinder portion 339a of the metallic outlet tube 339 is joined to an outlet-side opening end portion 336b of the second outer tube 336 by welding. Furthermore, an outlet-side flange 340 is joined to a small-diameter cylinder portion 339b of the outlet tube 339 by welding.

As shown in FIGS. 17 to 19, the anode 322c and the cathode 322d projecting out from an outer circumferential surface 322b of the electrically heated catalyst carrier 322a of the first electrically heated catalyst 322 project outwards by penetrating through the first inner tube 320 and the first outer tube 330. In addition, the anode 324c and the cathode 324d projecting out from an outer circumferential surface 324b of the electrically heated catalyst carrier 324a of the second electrically heated catalyst 324 project outward by penetrating through the first inner tube 320 and the first outer tube 330.

According to the exhaust gas processing device 310 described above, at the time of cold start (at the time of cold start) during the start of the engine, the electrically heated catalyst carriers 322a and 324a are each heated until the temperature of the exhaust gas G flowing into the inlet tube 311 reaches a range from 200° C. to 300° C. by applying the electric current to the respective electrically heated catalyst carriers 322a and 324a of the first and second electrically heated catalysts 322 and 324 through from the anodes 322c and 324c to the cathodes 322d and 324d. By performing the heating as described above, the respective catalyst components of the electrically heated catalyst carriers 322a and 324a are caused to reach the activation temperature within a short period of time. In other words, it is possible to achieve the activation of the respective catalyst components of the electrically heated catalyst carriers 322a and 324a within a very short period of time and to greatly improve a catalyst temperature increasing function during the cold start.

In addition, as shown in FIG. 19, the exhaust gas G that has passed through the pair of first three way catalysts 323 and 325 is guided to the upstream-side end surface 337a of the second way catalyst 337 on the downstream side along a lower curved shape of the tilted curved portion 333 of the first outer tube 330 and is directed to the small-diameter cylinder portion 339b from the large-diameter cylinder portion 339a of the outlet tube 339 after passing through the second way catalyst 337.

On the other hand, a part of the exhaust gas G that has passed through the pair of first three way catalysts 323 and 325 is returned to the outer circumference flow path 335 in the reversed direction along an upper curved shape of the tilted curved portion 333 of the first outer tube 330, flows in the outer circumference flow path 335 in the circumferential direction, and is directed towards the upstream-side end surface 337a of the second way catalyst 337 from the side of the spacing S4 between the second inner tube 321 and the second way catalyst 337. In other words, a part of the exhaust gas G that has passed through the pair of first three way catalysts 323 and 325 flows into the second way catalyst 337 by flowing around to the outer circumference flow path 335, and the remaining of the exhaust gas G that has passed through the pair of first three way catalysts 323 and 325 flows into the second way catalyst 337 without passing through the outer circumference flow path 335.

As described above, a sufficient amount of the exhaust gas G can be allowed to be directed to the outer circumference flow path 335 extending along the respective outer circumferential surfaces 320c and 321c of the first inner tube 320 and the second inner tube 321 that are the tube members, and a part of the exhaust gas G that has passed through the pair of first three way catalysts 323 and 325 are caused to flow around to the outer circumference flow path 335 along the curved shape of the tilted curved portion 333 of the first outer tube 330, and therefore, the pair of first three way catalysts 323 and 325 are heated from the surroundings. Therefore, after the engine has been started for example, the temperature of the pair of first three way catalysts 323 and 325 is quickly increased, and the activation of the catalyst is achieved quickly. Especially, because the downstream-side portion of the first three way catalyst 325 on the downstream side is heated from the surroundings, it can contribute to the increase in the temperature of the first three way catalyst 325.

In addition, by locating the surfaces of the outer circumferential surface 321c of the second inner tube 321 on the front side that do not form the outer circumference flow path 335 so as to face, via the spacing S4, the upstream-side end surface 337a of the second way catalyst 337 that is accommodated in and fitted to the second outer tube 336, by arranging the downstream-side end surface 325a of the first three way catalyst 325 on the downstream side and the upstream-side end surface 337a of the second way catalyst 337 so as to form the T-shape, and by allowing a part of the exhaust gas G that has passed through the first three way catalyst 325 to flow into the downstream-side end surface 325a of the first three way catalyst 325 by flowing around to the outer circumference flow path 335, it is possible to achieve space saving for the catalyst arrangement.

The small-diameter barrel portion 331 of the first outer tube 330 (the case) is welded to the first inner tube 320 (the inner case) at the position on the upstream side of the first electrically heated catalyst 322 and the position avoiding the outer circumference of the first electrically heated catalyst 322 in the first modification; however, the small-diameter barrel portion 331 of the first outer tube 330 may be welded to the first inner tube 320 at a position on the downstream side of the first electrically heated catalyst 322 and at a position avoiding the outer circumference of the first electrically heated catalyst 322.

In addition, the first electrically heated catalyst 322 and the second electrically heated catalyst 324 are provided so as to sandwich the TWC 323 on the upstream side therebetween in the first modification; however, the second electrically heated catalyst 324 may be omitted, or a third electrically heated catalyst may further be provided on the downstream side of the second electrically heated catalyst 324.

In addition, the inner case for holding the first electrically heated catalyst 322, etc. is formed by the first inner tube 320 and the second inner tube 321 in the first modification; however, the inner case may be formed by a single inner tube.

Furthermore, a spacing is provided between the second electrically heated catalyst 324 and the TWC 325 on the downstream side in the first modification; however, the second electrically heated catalyst 324 and the TWC 325 on the downstream side may be provided so as to come into contact without forming the spacing.

Furthermore, the TWC 325 (three way catalyst) serving as the second catalyst carrier is used in the first modification; however, the gasoline particulate filter (GPF), a diesel particulate filter (DPE), or the like may be used.

Figure 20:
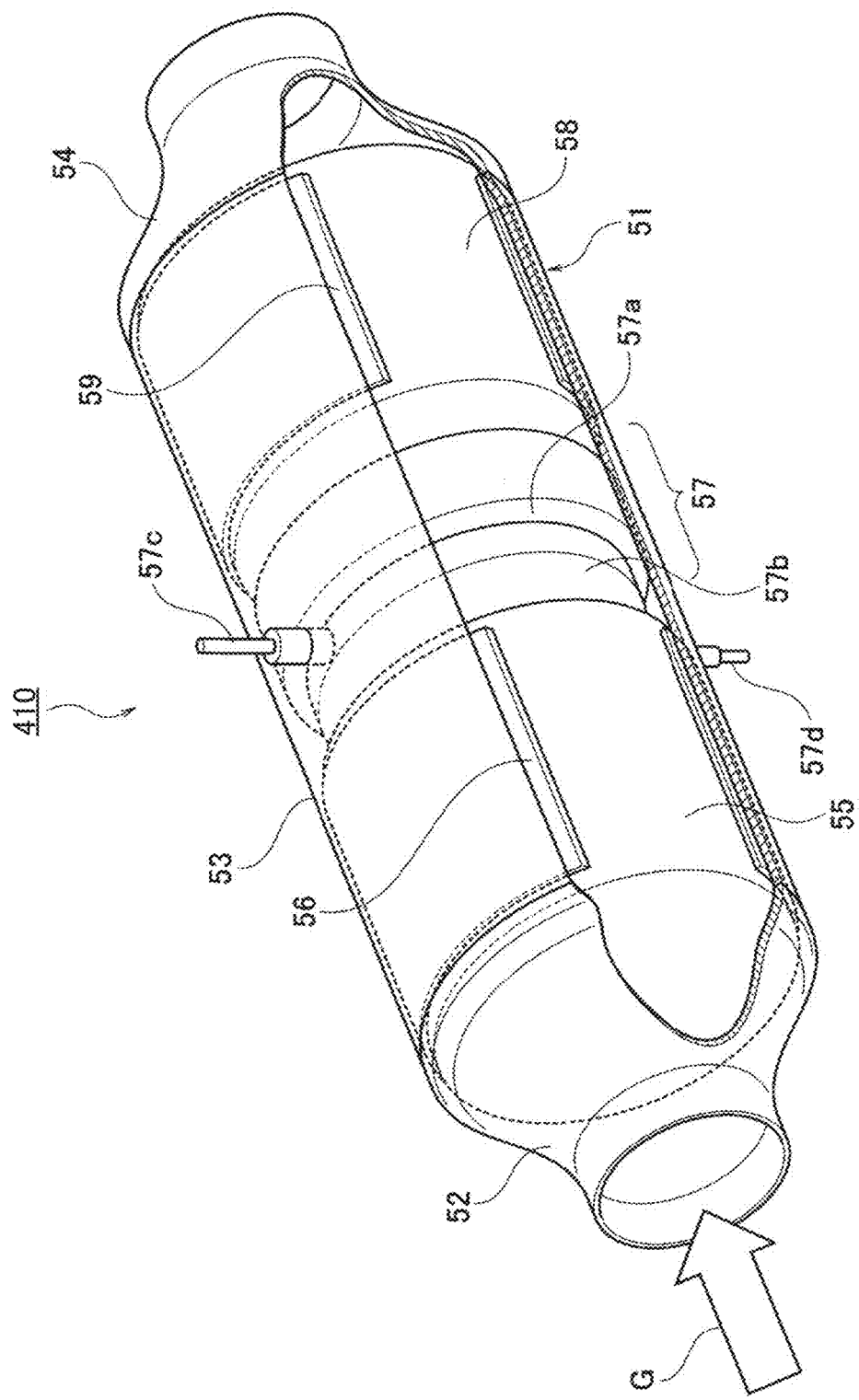
FIG. 20 is a perspective view of the exhaust gas processing device according to another modification of the second embodiment, in which a part thereof is shown in a sectional view.

Next, an exhaust gas processing device 410 that is a second modification of the exhaust gas processing device 210 will be described with reference to FIG. 20. FIG. 20 is a perspective view showing the exhaust gas processing device 410 of the second modification in which a part thereof is shown in a sectional view.

The exhaust gas processing device 410 has a specification in which an electrically heated catalyst (EHC) is provided and it is provided under a floor of the vehicle, and the catalyst case 51 thereof has a single layer structure. In other words, the catalyst case 51 is provided with: a metallic front case 52 having a circular conical surface shape in which the inlet-side (the upstream side) of the exhaust gas G is a cylinder-shape and the diameter of which is gradually increased towards the downstream side; a cylinder-shaped metallic middle case 53 that is joined to the downstream end side of the front case 52 by welding; and a metallic rear case 54 that is joined to the downstream end of the middle case 53 by welding, that has the circular conical surface shape, the diameter of which is gradually decreased towards the upstream side, and that has a cylinder shape on the outlet side (the downstream side) for the exhaust gas G.

As shown in FIG. 20, on the front case 52 side of the middle case 53, a columnar-shaped absorbent 55 that temporarily absorbs (traps) the hydrocarbons contained in the exhaust gas G is accommodated and held via a cylinder-shaped cushioning material 56.

In addition, a disc-step shaped electrically heated catalyst (EHC) 57 is accommodated and held in the center of the middle case 53 to speed up the activation by heating an electrically heated catalyst carrier 57a for cleaning the exhaust gas G by applying the electric current from an anode 57c to a cathode 57d.

Furthermore, a columnar-shaped three way catalyst (TWC) 58 serving as the catalyst carrier for cleaning the exhaust gas G is accommodated and held on the rear case 54 side of the middle case 53 via a cylinder-shaped cushioning material 59.

The anode 57c and the cathode 57d projecting out from an outer circumferential surface 57b of the electrically heated catalyst carrier 57a of the electrically heated catalyst 57 project outwards by penetrating through the middle case 53.

In the exhaust gas processing device 410 in this modification, when the engine is started from a state in which the engine is cold, the three way catalyst 58 cannot function fully, and so, the concentration of the hydrocarbon components in the exhaust gas G tends to become higher. At this time, the hydrocarbons are allowed to be absorbed in the absorbent 55 temporarily, and once the three way catalyst 58 is warmed up and activated, the hydrocarbons are then discharged while performing treatments. With such a configuration, it is possible to comply with the strict emission control regulations.

In addition, at the time of cold start of the engine, the electrically heated catalyst carrier 57a is heated until the temperature of the exhaust gas G flowing into the front case 52 reaches a range from 200° C. to 300° C. by applying the electric current to the electrically heated catalyst carrier 57a of the electrically heated catalyst 57 from the anode 57c to the cathode 57d. By performing the heating as described above, it is possible to cause the catalyst component of the electrically heated catalyst carrier 57a to reach the activation temperature within a short period of time.

Next, an electrically-heated-catalyst electrode cover 60 will be described with reference to FIGS. 21 to 23.

Figure 21:
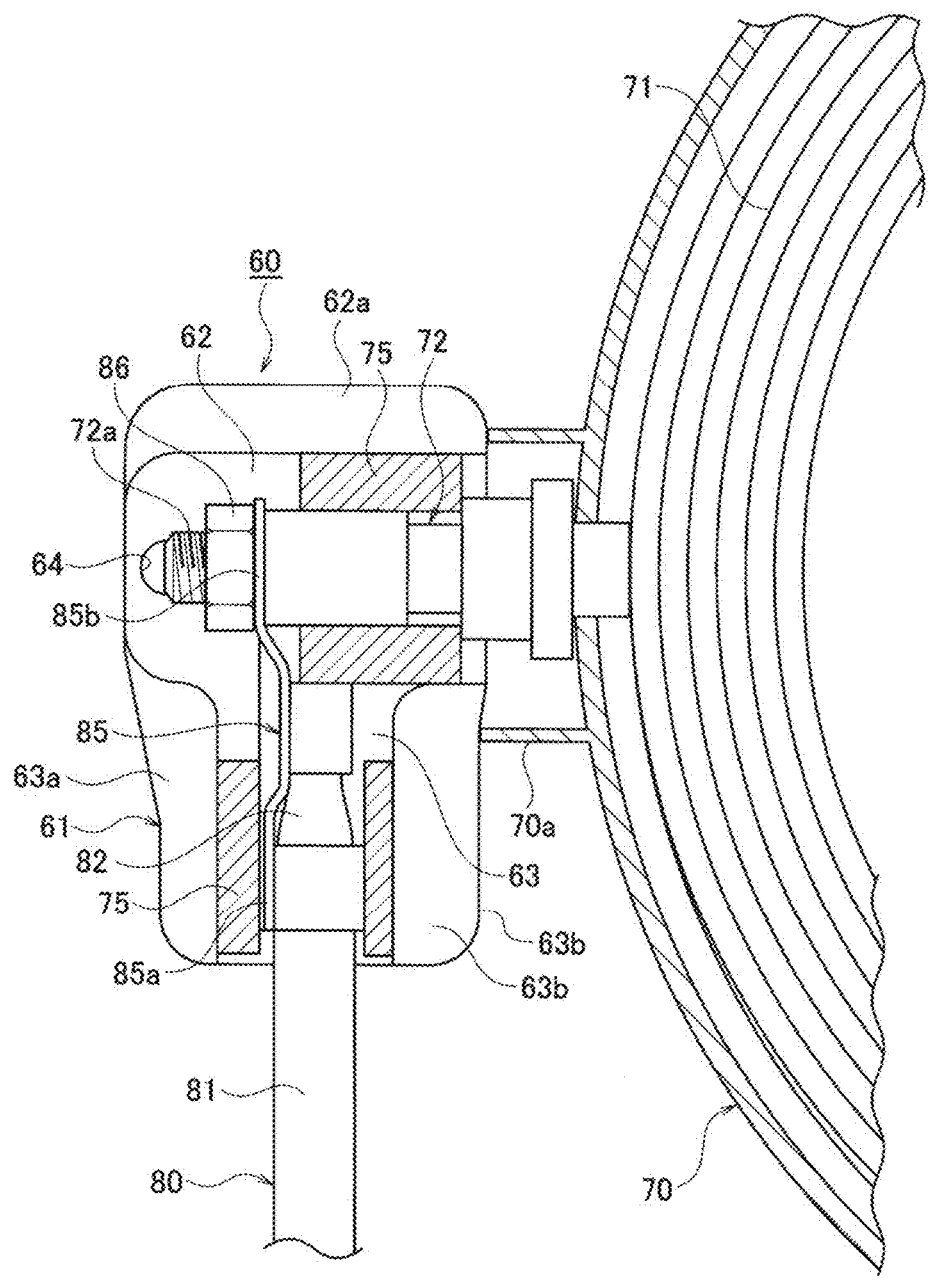
FIG. 21 is a plan view showing a state in which a lower-side cover of an electrically-heated-catalyst electrode cover is attached to an electrode projecting out from a case accommodating an electrically heated catalyst, in which a part thereof is shown in a sectional view.
Figure 22:
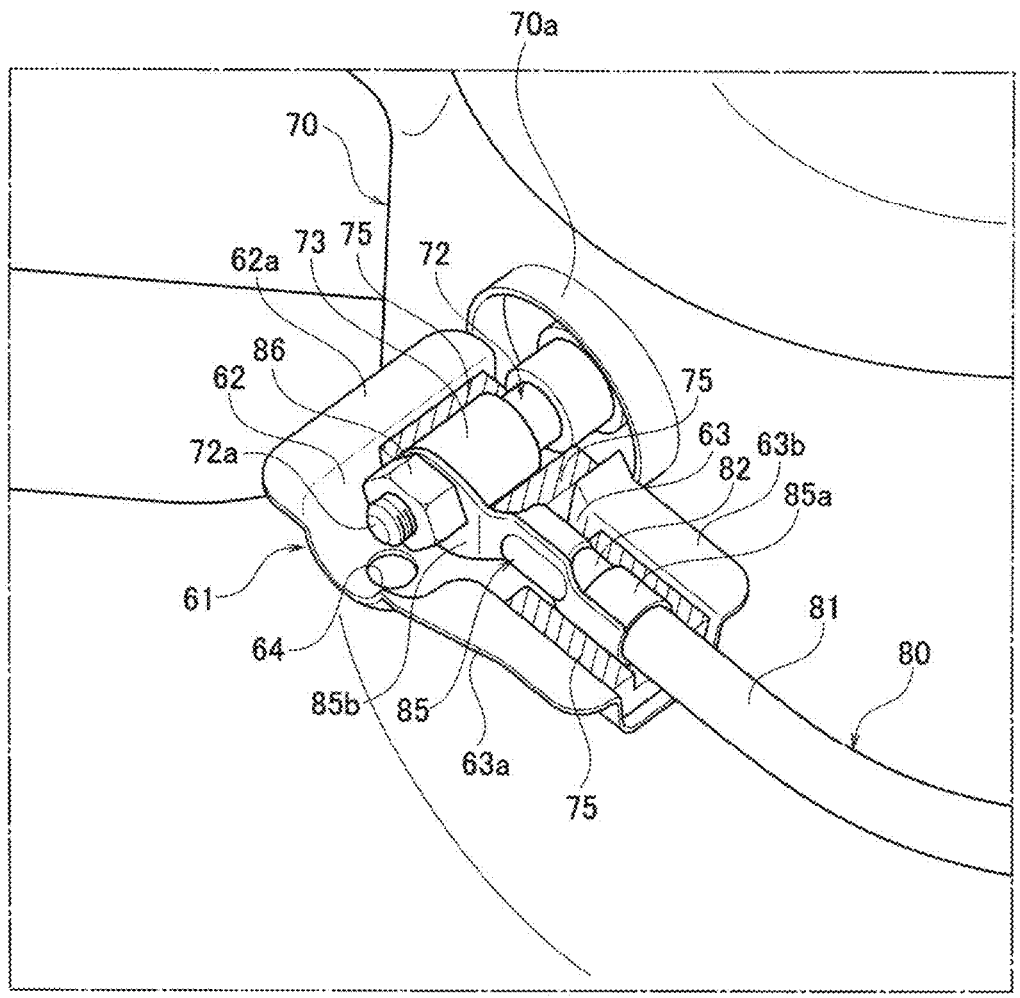
FIG. 22 is a perspective view showing a attachment state in which an upper-side cover of the electrically-heated-catalyst electrode cover is removed.
Figure 23:
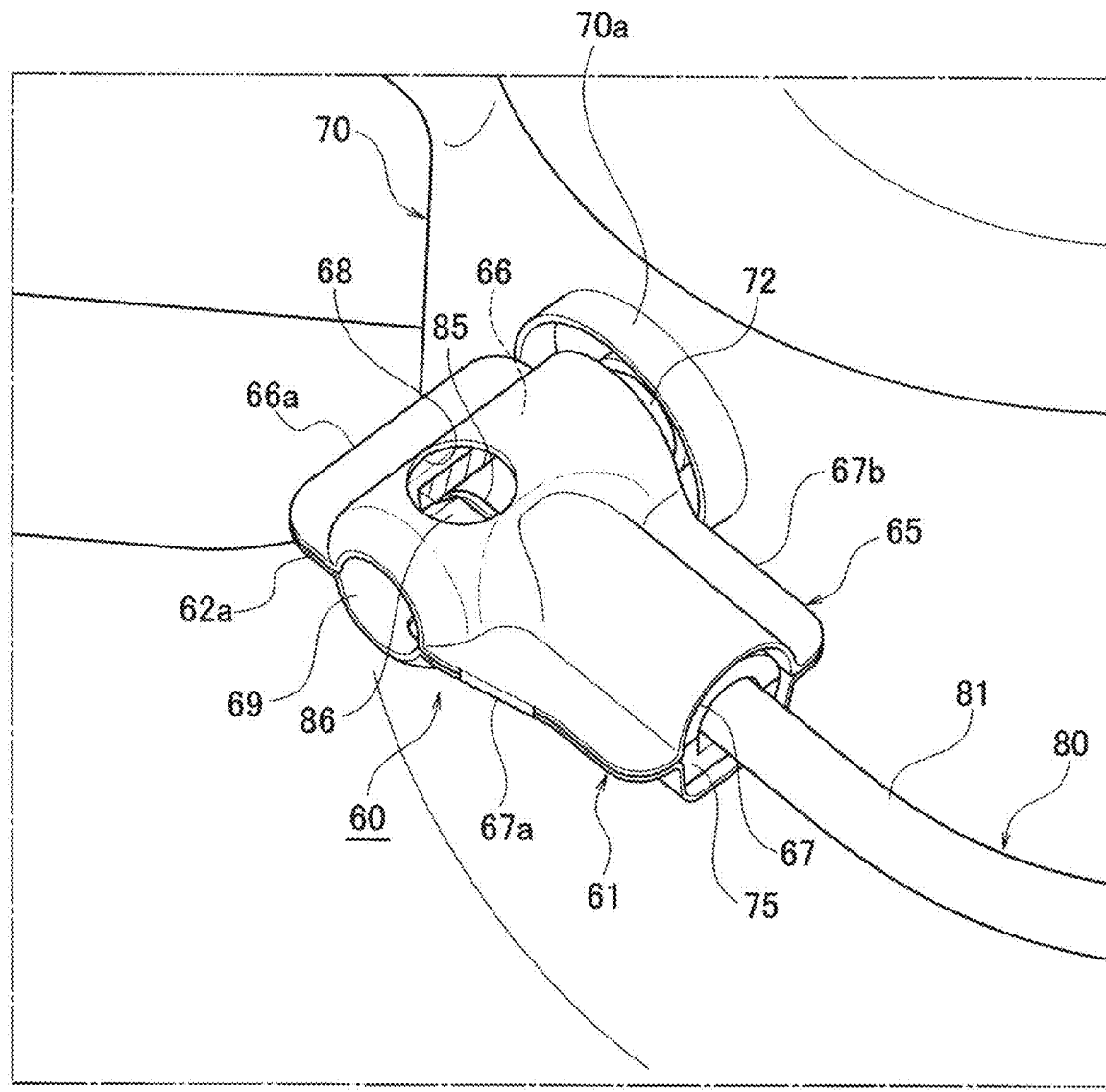
FIG. 23 is a perspective view showing the attachment state of the electrically-heated-catalyst electrode cover.

FIG. 21 is a plan view showing a state in which a lower-side cover 61 of the electrically-heated-catalyst electrode cover 60 is attached to an electrode 72 projecting out from a case 70 accommodating the electrically heated catalyst, in which a part thereof is shown in a sectional view, FIG. 22 is a perspective view showing an attachment state in which an upper-side cover 65 of the electrically-heated-catalyst electrode cover 60 is removed, and FIG. 23 is a perspective view showing an attachment state of the electrically-heated-catalyst electrode cover 60.

As shown in FIGS. 21 to 23, the electrically-heated-catalyst electrode cover 60 covers the electrode 72 that is exposed by projecting out from the metallic case 70 accommodating an electrically heated catalyst 71 and that applies the electric current to the electrically heated catalyst 71. The electrically-heated-catalyst electrode cover 60 has the metallic lower-side cover 61 that covers the lower side of the electrode 72 and the metallic upper-side cover 65 that covers the upper side of the electrode 72. In addition, the electrically-heated-catalyst electrode cover 60 is used so as to cover anodes 22c and 24c and cathodes 22d and 24d of the exhaust gas processing device 310 and the anode 57c and the cathode 57d of the exhaust gas processing device 410, and thereby, the electrically-heated-catalyst electrode cover 60 has a function of preventing a short circuit between the case main body for them and the electrodes.

The lower-side cover 61 and the upper-side cover 65 have concaved electrode accommodating portions 62 and 66 each covering the electrode 72 and concaved electric-wire accommodating portions 63 and 67 each accommodating a terminal side of an insulating layer 81 of a harness 80 for supplying electricity to the electrode 72, respectively, and the electrode accommodating portions 62 and 66 and the electric-wire accommodating portions 63 and 67 are formed to have an L-shape.

Circular hole portions 64 and 68, each forming an opening portion of a heat releasing passage, are respectively formed in respective parts located on the tip end side of the electrode 72 in the electrode accommodating portion 62 of the lower-side cover 61 and the electrode accommodating portion 66 of the upper-side cover 65. A hole size of the hole portion 64 of the lower-side cover 61 is formed to be larger than a hole size of the hole portion 68 of the upper-side cover 65 and to be larger than a hole size of a hole portion 69, which will be described later, forming an opening portion of a heat releasing passage formed between the lower-side cover 61 and the upper-side cover 65. In the above, the heat releasing passage is a passage that communicates a part of a threaded portion 72a of the electrode 72, which is a heat source in a broad sense, with outside air. In other words, the heat releasing passage is formed of: a space formed by covering the electrode 72 with the electrode accommodating portion 62 of the lower-side cover 61 and the electrode accommodating portion 66 of the upper-side cover 65; and each of the hole portions 64, 68, and 69 that is an opening portion for opening the space to the outside air. Furthermore, the hole portions 64, 68, and 69 are each provided at a portion facing a threadably-engaging-fastening portion of the threaded portion 72a of the electrode 72, which will be described later, and a nut 86 that is threadably engaged with the threaded portion 72a to fix a relay terminal 85.

In addition, as shown in FIG. 23, flat-shaped end edge portions 62a and 66a of the lower-side cover 61 and the upper-side cover 65 on the electrode accommodating portions 62 and 66 side and flat-shaped both end edge portions 63a, 67a, 63b, and 67b of the lower-side cover 61 and the upper-side cover 65 on the electric-wire accommodating portions 63 and 67 side are joined by a crimping processing. The circular hole portion 69 that is the opening portion of the heat releasing passage is formed between the lower-side cover 61 and the upper-side cover 65 that are joined together.

Furthermore, as shown in FIG. 22, a metallic sleeve 73 is fitted to the center of the electrode 72, and the threaded portion 72a is formed on the tip end side of the electrode 72 exposed from the sleeve 73. A ring-shaped tip end portion 85b of the L-shaped relay terminal 85 is fastened and fixed to the threaded portion 72a via the nut 86. A base end portion 85a side of the relay terminal 85 is crimped and fixed to a core wire 82 that is exposed at the terminal side of the insulating layer 81 of the harness 80. In addition, a heat insulating sheet material 75 is interposed between the sleeve 73 and the concaved electrode accommodating portions 62 and 66 of the lower-side cover 61 and the upper-side cover 65, and the heat insulating sheet material 75 is interposed between the base end portion 85a of the relay terminal 85 and the concaved electric-wire accommodating portions 63 and 67 of the lower-side cover 61 and the upper-side cover 65.

A cylinder-shaped wall portion 70a is integrally formed so as to project out around a position where the electrode 72 of the case 70 is exposed, and thereby, the electrically-heated-catalyst electrode cover 60 is prevented from coming into contact with the metallic case 70.

With the electrically-heated-catalyst electrode cover 60, because the lower-side cover 61 and the upper-side cover 65 forming the electrically-heated-catalyst electrode cover 60 have three hole portions 64, 68, and 69 that are the opening portions of the plurality of heat releasing passages, the heat generated by the electrode 72 that projects out from the case 70 accommodating the electrically heated catalyst 71 is released to the outside, and so, it is possible to prevent heat from being trapped between the concaved electrode accommodating portion 62 of the lower-side cover 61 and the concaved electrode accommodating portion 66 of the upper-side cover 65.

In other words, it is possible to allow the heat, which has been transmitted to the electrode 72 through the heat transmission, to be released downwards to the outside through the hole portion 64 formed in the lower-side cover 61, and in addition, water, dirt, and so forth are also allowed to be released to the outside through the hole portion 64. In addition, it is possible to allow the heat, which has been transmitted to the electrode 72 through the heat transmission, to be released upwards to the outside through the hole portion 68 formed in the upper-side cover 65. Furthermore, it is possible to allow the heat, which has been transmitted to the electrode 72 through the heat transmission, to be released towards the side to the outside through the hole portion 69 formed by the lower-side cover 61 and the upper-side cover 65, and in addition, it is possible to check a threadably-engaged-fastened state of the nut 86 and the threaded portion 72a of the electrode 72 for fixing the ring-shaped tip end portion 85b of the relay terminal 85.

In addition, in this configuration: the heat is transmitted to the tip end portion (the projected portion of the threaded portion 72a) of the electrode 72 because an outer circumference of the electrode 72 is thermally insulated by a heat insulating structure of the heat insulating sheet material 75 provided inside the lower-side cover 61 and the upper-side cover 65; the concaved electrode accommodating portions 62 and 66 are provided in the lower-side cover 61 and the upper-side cover 65 so as to cover the tip end portion of the electrode 72 to release the heat at the tip end portion; and further, the heat is released to the outside air through the hole portions (the through holes) 64, 68, and 69 that are the opening portions of the heat releasing passages. As described-above, because the hole portions 64, etc. face the tip end portion of the electrode 72, there is an effect in that it is easy to visually observe a fastening portion (the threadably-engaging-fastening portion) of the inside electrode 72 through the hole portions 64, 68, and 69.

Furthermore, the heat insulating sheet material 75 is interposed between the sleeve 73 and the concaved electrode accommodating portions 62 and 66 of the lower-side cover 61 and the upper-side cover 65, and the heat insulating sheet material 75 is interposed between the base end portion 85a of the relay terminal 85 and the concaved electric-wire accommodating portions 63 and 67 of the lower-side cover 61 and the upper-side cover 65, and therefore, it is possible to shield radiant heat from exhaust parts.

In the electrically-heated-catalyst electrode cover 60, the hole portions (through holes) 64, 68, and 69 that are the opening portions of the three heat releasing passages are provided in the lower-side cover 61 and the upper-side cover 65; however, one or two hole portions may be provided. In addition, the hole portion 69 may be provided to have a size (outer diameter) that allows tightening of the nut to the threaded portion 72a of the electrode 72 after the upper-side and lower-side covers 65 and 61 are fastened, and the hole portion 69 may also be provided to have a size that allows the check of a portion where the nut is tightened to the threaded portion 72a of the electrode 72.

In addition, in the electrically-heated-catalyst electrode cover 60, the heat insulating sheet material 75 is provided in a space between the upper-side and lower-side covers 65 and 61; however, the heat insulating sheet material 75 may not be provided, and in such a case, instead of providing the heat insulating sheet material 75, a layer formed of an insulating material (an insulating layer) may be provided on inner surfaces of the upper-side and lower-side covers 65 and 61. In other words, the insulating layer formed of the insulating material may be provided on the inner surfaces of the upper-side and lower-side covers 65 and 61 facing the electrode 72 (portions excluding faces at which the upper-side and lower-side covers 65 and 61 are joined), or an insulating coating may be applied to all of the mutually facing inner surfaces of the upper-side and lower-side covers 65 and 61 including joining faces at which the upper-side cover 65 and the lower-side cover 61 are joined. It is preferable that an insulating coating layer be formed by using materials having heat resistance.

Next, an electrically-heated-catalyst electrode cover 60' that is a modification of the electrically-heated-catalyst electrode cover 60 will be described with reference to FIGS. 24 to 28.

Figure 24:
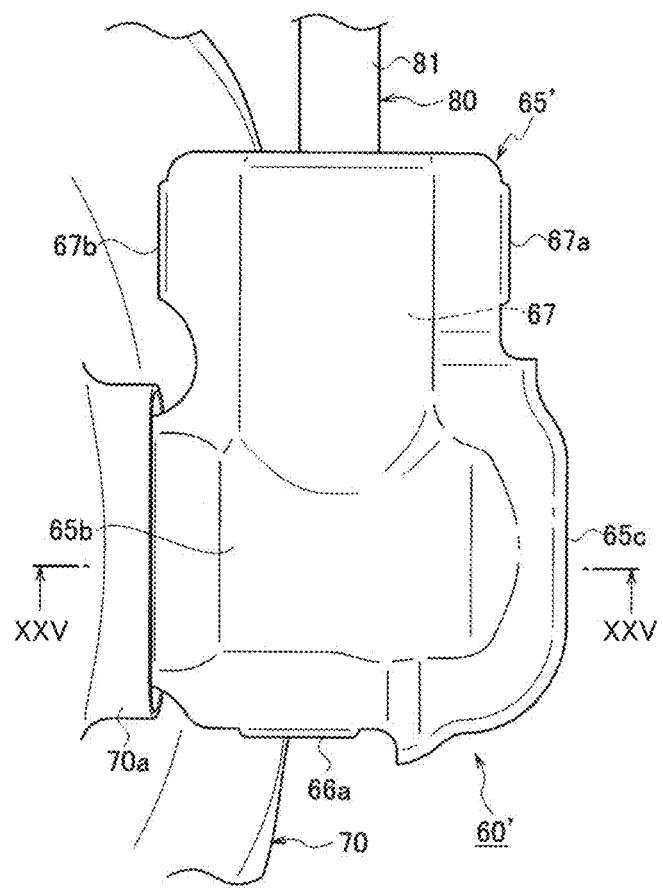
FIG. 24 is a plan view of a modification of the electrically-heated-catalyst electrode cover.
Figure 25:
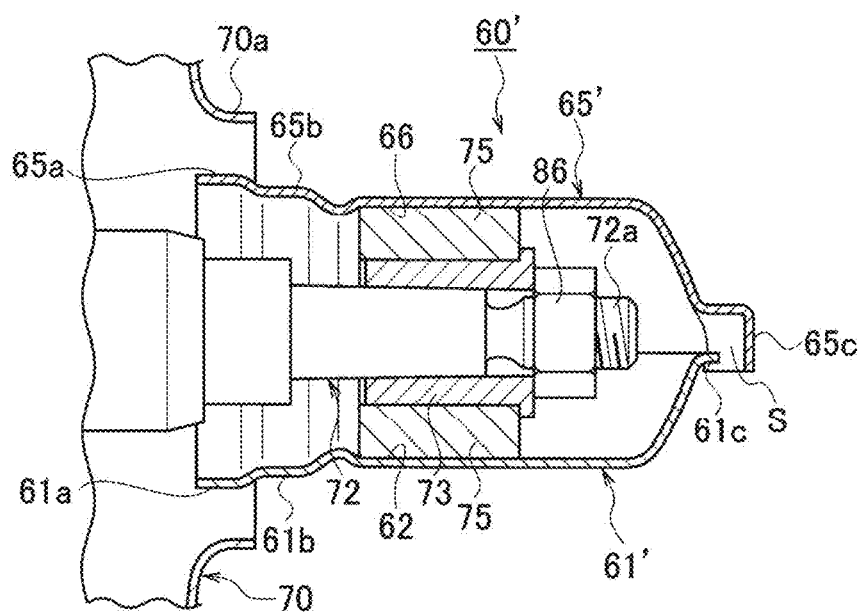
FIG. 25 is a sectional view taken along line XXV-XXV in FIG. 24.
Figure 26:
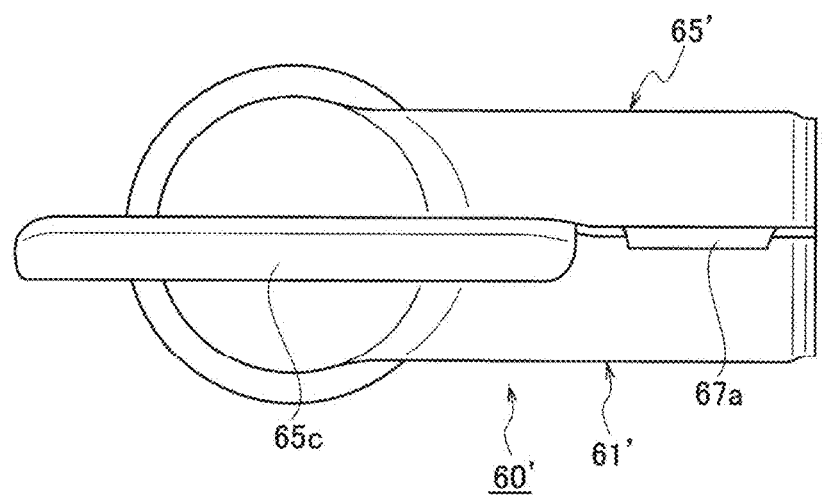
FIG. 26 is a front view of a modification of the electrically-heated-catalyst electrode cover.
Figure 27:
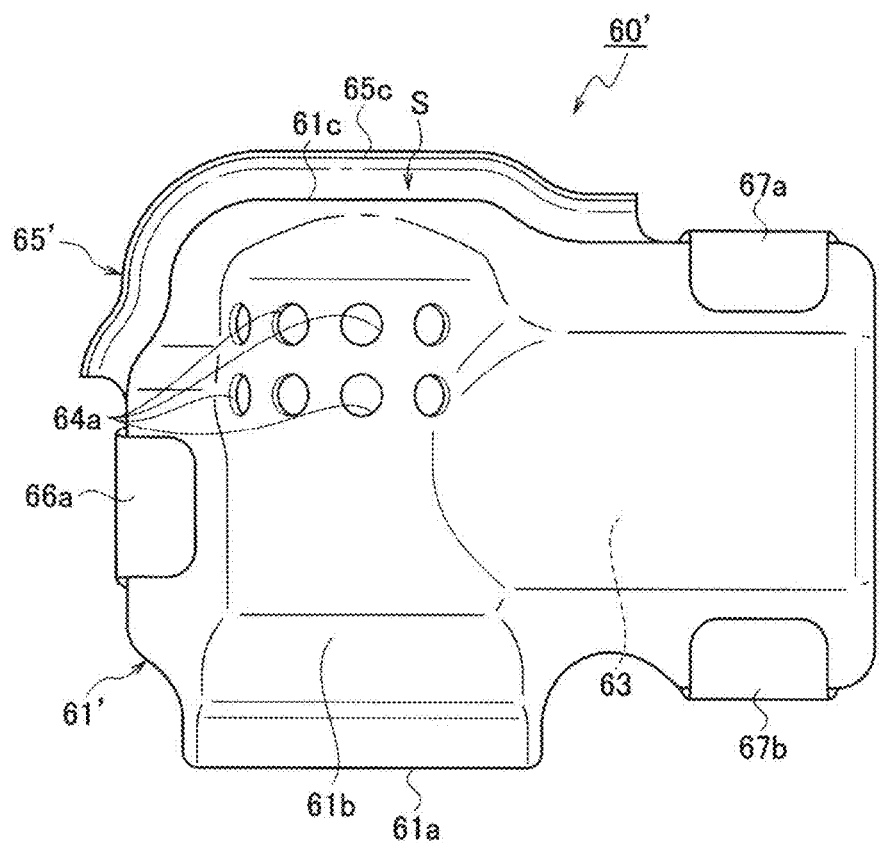
FIG. 27 is a bottom view of a modification of the electrically-heated-catalyst electrode cover.
Figure 28:
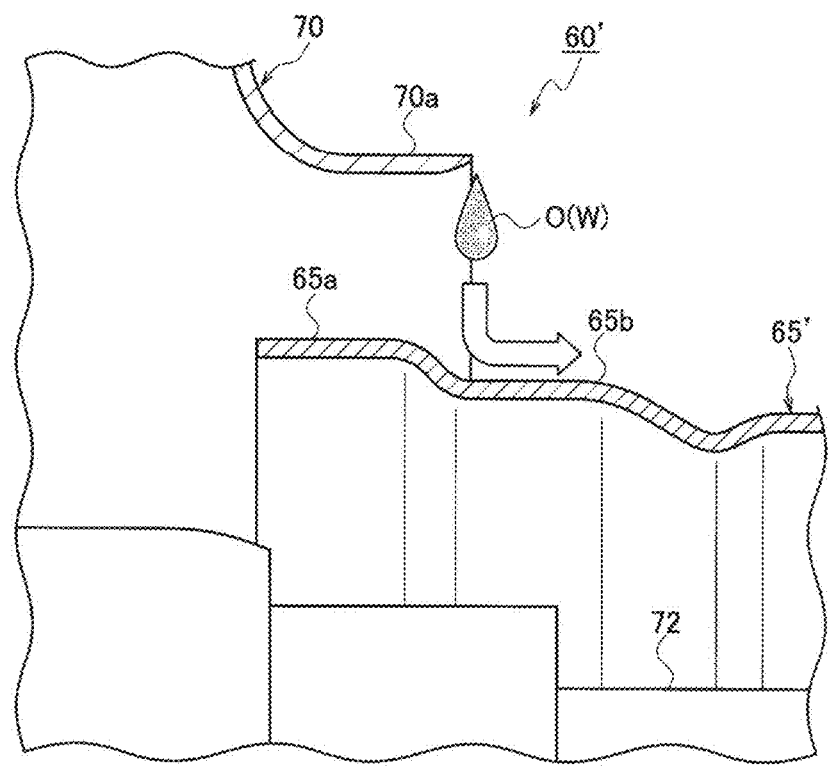
FIG. 28 is an enlarged sectional view of relevant portions showing a flow of fluid dropped on the upper-side cover of a modification of the electrically-heated-catalyst electrode cover.

FIG. 24 is a plan view of the electrically-heated-catalyst electrode cover 60', FIG. 25 is a sectional view taken along line XXV-XXV in FIG. 24, FIG. 26 is a front view of the electrically-heated-catalyst electrode cover 60', FIG. 27 is a bottom view of the electrically-heated-catalyst electrode cover 60', and FIG. 28 is an enlarged sectional view of relevant portions showing a flow of fluid dropped on an upper-side cover 65' of the electrically-heated-catalyst electrode cover 60'.

As shown in FIGS. 24 to 28, similarly to the electrically-heated-catalyst electrode cover 60, the electrically-heated-catalyst electrode cover 60' covers the electrode 72 that is exposed by projecting out from the metallic case 70 accommodating the electrically heated catalyst 71 and that applies the electric current to the electrically heated catalyst 71, and the electrically-heated-catalyst electrode cover 60' has a metallic lower-side cover 61' covering a lower side of the electrode 72 and the metallic upper-side cover 65' covering an upper side of the electrode 72.

As shown in FIG. 25, a base end portion 65a of the lower-side cover 61' and the base end portion 65a of the upper-side cover 65' are arranged so as to be inserted into the cylinder-shaped (barrel-shaped) wall portion 70a of the case 70 accommodating the electrically heated catalyst 71. In addition, a middle portion 61b of the lower-side cover 61' is formed so as to extends upwards in a stepwise manner, and a middle portion 65b of the upper-side cover 65' is formed so as to extends downwards in a stepwise manner. Furthermore, a tip end portion 65c of the upper-side cover 65' is bent to have a canopy shape (shade shape) so as cover a tip end portion 61c of the lower-side cover 61' by being separated from the tip end portion 61c.

As shown in FIGS. 25 and 27, the heat releasing passage S that communicates the portion of the threaded portion 72a of the electrode 72 with the outside air is formed by: a space formed between the canopy-shaped tip end portion 65c of the upper-side cover 65' and the tip end portion 61c of the lower-side cover 61'; and a space formed by covering the electrode 72 with the electrode accommodating portion 62 of the lower-side cover 61' and the electrode accommodating portion 66 of the upper-side cover 65'. In addition, as shown in FIG. 27, at a position of the lower-side cover 61' where the heat insulating sheet material 75 is not provided, a plurality of circular small hole portions 64a that are the opening portions of the heat releasing passages are provided. Furthermore, as shown in FIG. 27, a portion of the flat-shaped end edge portion 66a of the upper-side cover 65' on the electrode accommodating portion 66 side of the lower-side cover 61' and portions of the flat-shaped both end edge portions 67a and 67b of the upper-side cover 65' on the electric-wire accommodating portion 67 side of the lower-side cover 61' are each bent towards the lower-side cover 61' side and joined by a crimping processing.

With the electrically-heated-catalyst electrode cover 60' of the fourth embodiment, as shown in FIG. 28, even if the fluid, such as oil O, water W, or the like is dropped from the cylinder-shaped wall portion 70a of the case 70 to the upper-side cover 65', because of the middle portion 65b of the upper-side cover 65' that is formed so as to extend downwards in a stepwise manner, the fluid, such as the oil O, the water W, or the like, flows towards the outside from the middle portion 65b of the upper-side cover 65'. At this time, because the base end portion 65a of the upper-side cover 65' is arranged so as to be inserted into the cylinder-shaped wall portion 70a of the case 70, it is possible to surely prevent entrance of the fluid, such as the oil O, the water W, or the like, into the case 70 from the cylinder-shaped wall portion 70a. In addition, because the tip end portion 65c of the upper-side cover 65' is formed to have the canopy shape by being bent so as to cover the tip end portion 61c of the lower-side cover 61', it is possible to surely prevent the entry of the fluid, such as the oil O, the water W, or the like, into the space between the concaved electrode accommodating portion 62 of the lower-side cover 61' and the concaved electrode accommodating portion 66 of the upper-side cover 65' from the heat releasing passage S.

In addition, by providing the heat releasing passage S that is formed of: the space formed between the canopy-shaped tip end portion 65c of the upper-side cover 65' and the tip end portion 61c of the lower-side cover 61'; and the space formed by covering the electrode 72 with the electrode accommodating portion 62 of the lower-side cover 61' and the electrode accommodating portion 66 of the upper-side cover 65', it is possible to release the heat that has been transmitted to the electrode 72 towards the side to the outside. Furthermore, it is possible to allow the heat, which has been transmitted to the electrode 72 through the heat transmission, to be released downwards to the outside through the plurality of small hole portions 64a formed in the lower-side cover 61', and in addition, the water, the dirt, and so forth are also allowed to be released to the outside through the small hole portions 64a.

The configurations, operations, and effects of the embodiments of the present invention configured as described above will be collectively described.

The exhaust gas processing device 10, 10', 110, 210 is provided with: the first catalyst carrier (the TWC 12) configured to clean the exhaust gas G flowing along the first direction P; the second catalyst carrier (the GPF 14) configured to clean the exhaust gas G that has passed through the first catalyst carrier (the TWC 12), the exhaust gas G flowing along the second direction Q intersecting with the first direction P; the case 30 configured to accommodate the first catalyst carrier (the TWC 12) and the second catalyst carrier (the GPF 14); and a sensor (the air-fuel ratio sensor 40) having the measuring portion 41 for measuring the exhaust gas G, the sensor being configured to determine the exhaust gas G that has passed through the first catalyst carrier (the TWC 12). The measuring portion 41 of the sensor (the air-fuel ratio sensor 40) is arranged in a region surrounded by the downstream-side end surface 12*c* of the first catalyst carrier (the TWC 12), the upstream-side end surface 14*b* of the second catalyst carrier (the GPF 14), and the inner wall surface 31*c* of the case, the inner wall surface 31*c* being configured to receive the exhaust gas G that has passed through the first catalyst carrier (the TWC 12), the region (the region A1) being on the second catalyst carrier (the GPF 14) side of the center of the first catalyst carrier (the TWC 12).

According to such a configuration, the measuring portion 41 of the sensor (the air-fuel ratio sensor 40) is located in the region surrounded by the downstream-side end surface 12*c* of the first catalyst carrier (the TWC 12), the upstream-side end surface 14*b* of the second catalyst carrier (the GPF 14), and the inner wall surface 31*c* of the case 30, that is the region (the region A1) on the second catalyst carrier (the GPF 14) side of the center of the first catalyst carrier (the TWC 12). In this region (the region A1), because the main flow of the flow of the exhaust gas G directed from the first catalyst carrier (the TWC 12) towards the second catalyst carrier (the GPF 14) is formed, the flow rate of the exhaust gas G becomes relatively high. Therefore, when the flowing direction of the exhaust gas G flowing through the first catalyst carrier (the TWC 12) intersects with the flowing direction of the exhaust gas G flowing through the second catalyst carrier (the GPF 14), highly accurate detection of the numerical values can be achieved by the sensor (the air-fuel ratio sensor 40) determining the exhaust gas G. Thus, it is possible to provide the small-sized exhaust gas processing device 10, 10', 110, 210 capable of determining the exhaust gas components with high accuracy while mounting a plurality of catalysts.

In addition, for example, even when the entry condition, under which the exhaust gas G enters the exhaust gas processing device 10, is changed depending on the configuration such as the number of cylinders in the engine or the presence of installed turbocharger, a driven state of the engine, or the like, by forming the exhaust gas flow path (the main flow, that is the flow path in which the flow rate is relatively higher than other flow paths) in which the exhaust gas G that has passed through the above-described first catalyst carrier (the TWC 12) flows towards the second catalyst carrier (the GPF 14) side while being caused to hit the inner wall surface 31*c* of the case 30, it is possible to perform the measurement for the exhaust gas G by the sensor (the air-fuel ratio sensor 40) with high accuracy and stably. In other words, it is possible to realize the exhaust gas processing device 10 that is capable of adapting various engine specifications and changes in driving situations of the engine.

In addition, the case 30 has the diverting portion 33 configured to divert the exhaust gas G that has passed through the first catalyst carrier (the TWC 12) and to guide a part thereof to the second catalyst carrier (the GPF 14), and the measuring portion 41 is arranged in the region (the region A) in which the flow rate of the exhaust gas G that has been diverted by the diverting portion 33 and guided to the second catalyst carrier (the GPF 14) is increased.

In addition, the case 30 has the diverting portion 33 provided in the inner wall surface 31*c*, the diverting portion 33 being configured to divert and guide a part of the exhaust gas G that has passed through the first catalyst carrier (the TWC 12) to the second catalyst carrier (the GPF 14). The measuring portion 41 is arranged in the region (the region A) in which the exhaust gas G flows in the tangential direction D with respect to the top part 33*a* of the diverting portion 33 and flows towards the second catalyst carrier (the GPF 14) after being diverted by the diverting portion 33, the top part 33*a* protruding the most in the first direction P.

With such configurations, a part of the exhaust gas G that has passed through the first catalyst carrier (the TWC 12) flows against the diverting portion 33 formed in the inner wall surface 31*c* of the case 30, changes its direction to the tangential direction D with respect to the top part 33*a* of the diverting portion 33, and then, flows towards the second catalyst carrier (the GPF 14). In the region (the region A) in which the exhaust gas G flowing towards the second catalyst carrier (the GPF 14) flows, because the exhaust gas G that has hit the diverting portion 33 and that has been redirected is guided, the flow rate of the exhaust gas G is especially high in the region A1. Thus, by providing the sensor (the air-fuel ratio sensor 40) in the region A, it is possible to allow the sensor (the air-fuel ratio sensor 40) for determining the exhaust gas G to be able to detect numerical values with high accuracy. In the above-described embodiment, a description has been given of a configuration in which the diverting portion 33 is provided in the case 30 as described above; however, only the flow rate of the exhaust gas G flowing towards the second catalyst carrier (the GPF 14) side may be adjusted by, for example, the shape of the inner wall surface 31*c* of the case 30 without providing such a diverting portion 33.

In addition, the main body portion of the sensor (the air-fuel ratio sensor 40) is attached from the outside of the case 30 to the flat surface portion 31*d* provided in the case 30.

According to such a configuration, because it is easy to form the boss in the flat surface portion 31*d* provided in the case 30 than in a curved portion, it is possible to form the boss for attaching the sensor (the air-fuel ratio sensor 40) with ease.

In addition, the case 30 has the bonded portion 31*e* formed by abutting and joining plate members, and the sensor (the air-fuel ratio sensor 40) is attached at a position avoiding the bonded portion 31*e*.

According to such a configuration, because it is difficult to form the boss in the bonded portion 31*e* of the plate members, it is possible to form the boss for attaching the sensor (the air-fuel ratio sensor 40) with ease by avoiding the bonded portion 31*e*. In addition, by arranging the sensor (the air-fuel ratio sensor 40) at a portion of one of the plate members dividing the case 30 that avoids the bonded portion 31*e*, it is possible to ensure the strength of the bonded portion 31*e*.

In addition, when the first catalyst carrier (the TWC 12) and the second catalyst carrier (the GPF 14) are viewed from the direction intersecting with the first direction P and the second direction Q perpendicularly, both ends of the first catalyst carrier (the TWC 12) in the first direction P are located between both ends of the second catalyst carrier (the GPF 14) in the first direction P.

According to such a configuration, because the first catalyst carrier (the TWC 12) does not project outwards from the second catalyst carrier (the GPF 14) in the first direction P, it is possible to reduce the size of the exhaust gas processing device 10. In addition, even in a case in which the heater or the catalyst provided with the heater is provided on the upstream side of the first catalyst carrier (the TWC 12) in the first direction P, it is possible to reduce the projecting amount of the heater or the catalyst provided with the heater in the first direction P.

In addition, the case 30 has: a barrel portion (the inlet-side barrel portion 31) configured to form the outer circumference flow path 35 with the outer circumferential surface of the first catalyst carrier (the TWC 12), the outer circumference flow path 35 being configured to allow the exhaust gas G to flow therethrough; the diverting portion 33 formed in the inner wall surface 31c, the diverting portion 33 being configured to guide a part of the exhaust gas G that has passed through the first catalyst carrier (the TWC 12) to the second catalyst carrier (the GPF 14); and the guide portion 32 configured to guide the remaining of the exhaust gas G to the outer circumference flow path 35, the exhaust gas G having been diverted by the diverting portion 33.

According to such a configuration, of the exhaust gas G that has been diverted by the diverting portion 33, the remaining of the exhaust gas G that has not been guided to the second catalyst carrier (the GPF 14) is guided to the outer circumference flow path 35 and is directed towards the second catalyst carrier (the GPF 14) by flowing the outer circumference flow path 35 in the circumferential direction. At this time, the exhaust gas G that is guided to the outer circumference flow path 35 heats the first catalyst carrier (the TWC 12) from the outer circumference thereof. Thus, it is possible to increase the temperature of the first catalyst carrier (the TWC 12) within a short period of time soon after the engine has been started and to achieve the activation of the first catalyst carrier (the TWC 12). Especially, by heating the downstream-side portion of the first catalyst carrier (the TWC 12) in the first direction P, at which the temperature of the first catalyst carrier (the TWC 12) tends not to be increased, from the outer circumference, it is possible to shorten the time required to activate the whole first catalyst carrier (the TWC 12).

In addition, the guide portion 32 has the tilted portion 32a tilted with respect to the flat plane X orthogonal to the first direction P by the predetermined angle θ from the diverting portion 33 towards the downstream side in the first direction P.

According to such a configuration, the guide portion 32 has the tilted portion 32a that is tilted from the diverting portion 33 towards the downstream side in the first direction P. By providing the tilted portion 32a, it is possible to redirect the exhaust gas G that has been diverted by the diverting portion 33 gradually and to guide it to the outer circumference flow path 35 along the inner wall surface 31c of the case 30. Thus, it is possible to guide the exhaust gas G to the outer circumference flow path 35 without disturbing the flow of the exhaust gas G towards the diverting portion 33 through the first catalyst carrier (the TWC 12).

In addition, the case 30 has the barrel portion (the inlet-side barrel portion 31) forming the outer circumference flow path 35 for allowing the exhaust gas G to flow therethrough, the outer circumference flow path 35 being formed between the barrel portion (the inlet-side barrel portion 31) and the outer circumferential surface 12a of the first catalyst carrier (the TWC 12), and the first catalyst carrier (the TWC 12) is accommodated in the inner case 20 over the entirety in the first direction P, the inner case 20 being provided in the case 30 so as to face the barrel portion (the inlet-side barrel portion 31) such that the outer circumference flow path 35 is sandwiched between the inner case 20 and the barrel portion (the inlet-side barrel portion 31).

According to such a configuration, by providing the inner case 20, the exhaust gas G flowing through the outer circumference flow path 35 does not flow into the first catalyst carrier (the TWC 12) and heats the first catalyst carrier (the TWC 12) from the outer circumference. Therefore, it is possible to reduce the resistance in the flow path of the exhaust gas G directed from the outer circumference flow path 35 towards the second catalyst carrier (the GPF 14). In addition, because the exhaust gas G flowing through the outer circumference flow path 35 does not flow into the first catalyst carrier (the TWC 12), the flow of the exhaust gas G flowing in the first catalyst carrier (the TWC 12) towards the first direction P is prevented from being disturbed. In the above-described embodiment, although the double tube structure in which the first catalyst carrier (the TWC 12) covered by the inner case 20 is arranged within the case 30 is employed, of course, the present invention is not limited thereto, and for example, two catalysts may be directly arranged in a single case. In other words, the present invention also includes a configuration in which: the first catalyst and the second catalyst are laid out in a single case; only a flow path for guiding the exhaust gas G that has passed through the first catalyst to the second catalyst is provided; and a case wall surface forming the flow path and receiving the exhaust gas G flowing out from the first catalyst is formed to have a shape in which a distance from the first catalyst is partially increased (the shape of the case 30 shown in FIG. 16), and thereby, the region, in which the flow rate is high, is formed in the flow path of the exhaust gas G, and a detection point (a contact point with the exhaust gas G) of the sensor (the air-fuel ratio sensor 40) is provided in this region.

In the above-mentioned embodiment, a description has been given of the example in which the air-fuel ratio sensor 40 is employed as the sensor; however, other sensors for determining numerical values for the exhaust gas G may also be applied as the sensor.

The position for providing the flat surface portion 231d may be any position, provided that the measuring portion 41 is located in the region A1 or the region A when the air-fuel ratio sensor 40 is attached.

The invention claimed is:
1. An exhaust gas processing device comprising:
a first catalyst carrier configured to clean exhaust gas flowing along a first direction;
a second catalyst carrier configured to clean the exhaust gas that has passed through the first catalyst carrier, the exhaust gas flowing along a second direction intersecting with the first direction;
a case configured to accommodate the first catalyst carrier and the second catalyst carrier;
a sensor having a measuring portion for measuring the exhaust gas, the sensor being configured to determine the exhaust gas that has passed through the first catalyst carrier;
an outer circumference flow path provided between an outer circumferential surface of the first catalyst carrier and an inner circumferential surface of the case, the outer circumference flow path surrounding an outer circumference of the first catalyst carrier; and
a diverting portion formed by the case protruded inwardly, the diverting portion being configured to divert the exhaust gas that has passed through the first catalyst carrier so as to guide the exhaust gas towards each of the second catalyst carrier and the outer circumference flow path, wherein the sensor extends into the case through a flat portion located adjacent to the diverting portion, the flat portion extending away from the first catalyst carrier along an axis intersecting the first direction so as to define an acute angle therebetween, wherein the measuring portion of the sensor is arranged in a region surrounded by a downstream-side end surface of the first catalyst carrier, an upstream-side end surface of the second catalyst carrier, and an inner wall surface of the case, the inner wall surface being configured to receive the exhaust gas that has passed through the first catalyst carrier, the region being on the second catalyst carrier side of a center of the first catalyst carrier, the measuring portion is arranged in a region in which the exhaust gas flows from the diverting portion towards the second catalyst carrier, and an angle formed by a top part of the diverting portion is from 70° to 120°.

2. The exhaust gas processing device according to claim 1, further comprising:

an electrically heated catalyst arranged on an upstream side of the first catalyst carrier, the electrically heated catalyst having a heater for heating the exhaust gas.

3. The exhaust gas processing device according to claim 1, further comprising:

a heater arranged on an upstream side of the first catalyst carrier, the heater being configured to heat the exhaust gas.

4. The exhaust gas processing device according to claim 1, wherein the first catalyst carrier has a metallic layer provided on the outer circumferential surface, the metallic layer being configured to be able to heat the first catalyst carrier by supplying electricity.

5. The exhaust gas processing device according to claim 1, wherein the second catalyst carrier is arranged on a downstream side of the first catalyst carrier in a direction of a gravitational force.

6. The exhaust gas processing device according to claim 1, wherein the measuring portion is arranged so as to face down in a direction of a gravitational force.

7. The exhaust gas processing device according to claim 1, wherein the measuring portion is arranged in a region in which the exhaust gas flows in a tangential direction with respect to the top part of the diverting portion protruding in the first direction, the exhaust gas flowing towards the second catalyst carrier by being diverted by the diverting portion.

8. The exhaust gas processing device according to claim 1, wherein a main body portion of the sensor is attached from outside of the case to a flat surface portion provided in the case.

9. The exhaust gas processing device according to claim 1, wherein the case has a bonded portion formed by abutting and joining plate members, and the sensor is attached at a position avoiding the bonded portion.

10. The exhaust gas processing device according to claim 1, wherein when the first catalyst carrier and the second catalyst carrier are viewed from a direction intersecting with the first direction and the second direction perpendicularly, both ends of the first catalyst carrier in the first direction are located between both ends of the second catalyst carrier in the first direction.

11. The exhaust gas processing device according to claim 1, wherein the case has:

a barrel portion configured to form the outer circumference flow path; and a guide portion configured to guide the exhaust gas to the outer circumference flow path, the exhaust gas having been diverted by the diverting portion.

12. The exhaust gas processing device according to claim 11, wherein the guide portion has a tilted portion tilted with respect to a flat plane orthogonal to the first direction by a predetermined angle from the diverting portion towards a downstream side in the first direction.

13. The exhaust gas processing device according to claim 1, wherein the case has a barrel portion forming the outer circumference flow path, and the first catalyst carrier is accommodated in an inner case over an entirety in the first direction, the inner case being provided in the case so as to face the barrel portion such that the outer circumference flow path is sandwiched between the inner case and the barrel portion.

14. The exhaust gas processing device according to claim 1, wherein the sensor is arranged such that the measuring portion is oriented towards a downstream side in a flowing direction of the exhaust gas.

15. The exhaust gas processing device according to claim 1, wherein a main body portion of the sensor is attached to an indentation, the indentation being provided on an outer side of the case by forming the diverting portion.

16. The exhaust gas processing device according to claim 1, wherein the outer circumference flow path surrounds over an entire circumference of the first catalyst carrier.

17. An exhaust gas processing device comprising:

a first catalyst carrier configured to clean exhaust gas flowing along a first direction;

a second catalyst carrier configured to clean the exhaust gas that has passed through the first catalyst carrier, the exhaust gas flowing along a second direction intersecting with the first direction;

a case configured to accommodate the first catalyst carrier and the second catalyst carrier;

a sensor having a measuring portion for measuring the exhaust gas, the sensor being configured to determine the exhaust gas that has passed through the first catalyst carrier;

an outer circumference flow path provided between an outer circumferential surface of the first catalyst carrier and an inner circumferential surface of the case, the outer circumference flow path surrounding an outer circumference of the first catalyst carrier; and a diverting portion formed by the case protruded inwardly such that the diverting portion is positioned in a flow path through the first catalyst carrier in the first direction, the diverting portion being configured to divert the exhaust gas that has passed through the first catalyst carrier so as to guide the exhaust gas towards each of the second catalyst carrier and the outer circumference flow path, wherein the measuring portion of the sensor is arranged in a region surrounded by a downstream-side end surface of the first catalyst carrier, an upstream-side end surface of the second catalyst carrier, and an inner wall surface of the case, the inner wall surface being configured to receive the exhaust gas that has passed through the first catalyst carrier, the region being on the second catalyst carrier side of a center of the first catalyst carrier, the measuring portion is arranged in a region in which the exhaust gas flows from the diverting portion towards the second catalyst carrier, and wherein the diverting portion is configured such that a top part of the diverting portion defines a first angle with a tilted portion extending therefrom that lies within a range of 70° to 120°, the tilted portion defining a second angle with a reference plane oriented in orthogonal relation to the first direction that lies within a range of 3° to 20.

\* \* \* \* \*